(12) United States Patent
Nagumo et al.

(10) Patent No.: US 8,387,156 B2
(45) Date of Patent: Feb. 26, 2013

(54) EQUIPMENT MANAGING SYSTEM, EQUIPMENT MANAGING METHOD, AND COMPUTER-READABLE STORAGE MEDIUM

(75) Inventors: Taku Nagumo, Kanagawa (JP); Yuuko Sugiura, Tokyo (JP); Tomoya Hirokawa, Kanagawa (JP); Taku Ikawa, Kangawa (JP)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 12/877,163

(22) Filed: Sep. 8, 2010

(65) Prior Publication Data

US 2011/0067117 A1   Mar. 17, 2011

(30) Foreign Application Priority Data

Sep. 14, 2009  (JP) ................................ 2009-212455

(51) Int. Cl.
*H04L 29/06* (2006.01)
(52) U.S. Cl. ................ 726/30; 726/26; 726/27; 726/28; 726/29; 726/31; 726/32; 726/33; 705/50; 705/51; 705/55; 705/56; 705/57; 705/58; 705/59; 709/217; 709/218; 709/219; 709/226; 709/229
(58) Field of Classification Search .............. 726/26–33; 705/50–59; 709/217–229
See application file for complete search history.

(56) References Cited

U.S. PATENT DOCUMENTS

| | | | | |
|---|---|---|---|---|
| 5,892,900 A | * | 4/1999 | Ginter et al. | ..................... 726/26 |
| 5,946,677 A | * | 8/1999 | Bullen | ......................... 707/700 |
| 6,189,146 B1 | * | 2/2001 | Misra et al. | .................... 717/177 |
| 2002/0194010 A1 | * | 12/2002 | Bergler et al. | ..................... 705/1 |
| 2004/0148408 A1 | * | 7/2004 | Nadarajah | ..................... 709/229 |
| 2007/0265976 A1 | * | 11/2007 | Helfer et al. | .................... 705/59 |
| 2008/0209569 A1 | | 8/2008 | Araki et al. | |
| 2010/0058482 A1 | | 3/2010 | Nagumo et al. | |
| 2010/0071069 A1 | | 3/2010 | Sugiura et al. | |

FOREIGN PATENT DOCUMENTS

| | | |
|---|---|---|
| JP | 2008-243179 | 10/2008 |
| JP | 2010-072875 | 4/2010 |

* cited by examiner

*Primary Examiner* — Thanhnga B Truong
*Assistant Examiner* — Madhuri Herzog
(74) *Attorney, Agent, or Firm* — IPUSA, PLLC

(57) ABSTRACT

An equipment managing system includes an intermediating apparatus and an equipment managing apparatus. The intermediating apparatus is connected to a license management apparatus and a program management apparatus via a network. The equipment managing apparatus is connected to an electronic equipment via a network. The intermediating apparatus stores a program acquired from the program management apparatus and a license file acquired from the license management apparatus to an external storage medium. The equipment managing apparatus sends the program and the license file recorded in the external storage medium to the electronic equipment.

19 Claims, 22 Drawing Sheets

FIG.3

| PRODUCT ID |
|---|
| VERSION |
| NAME |
| DESCRIPTION |
| VENDOR NAME |
| : |

FIG.4

| PRODUCT ID |
|---|
| VERSION |
| NAME |
| DESCRIPTION |
| VENDOR NAME |
| : |

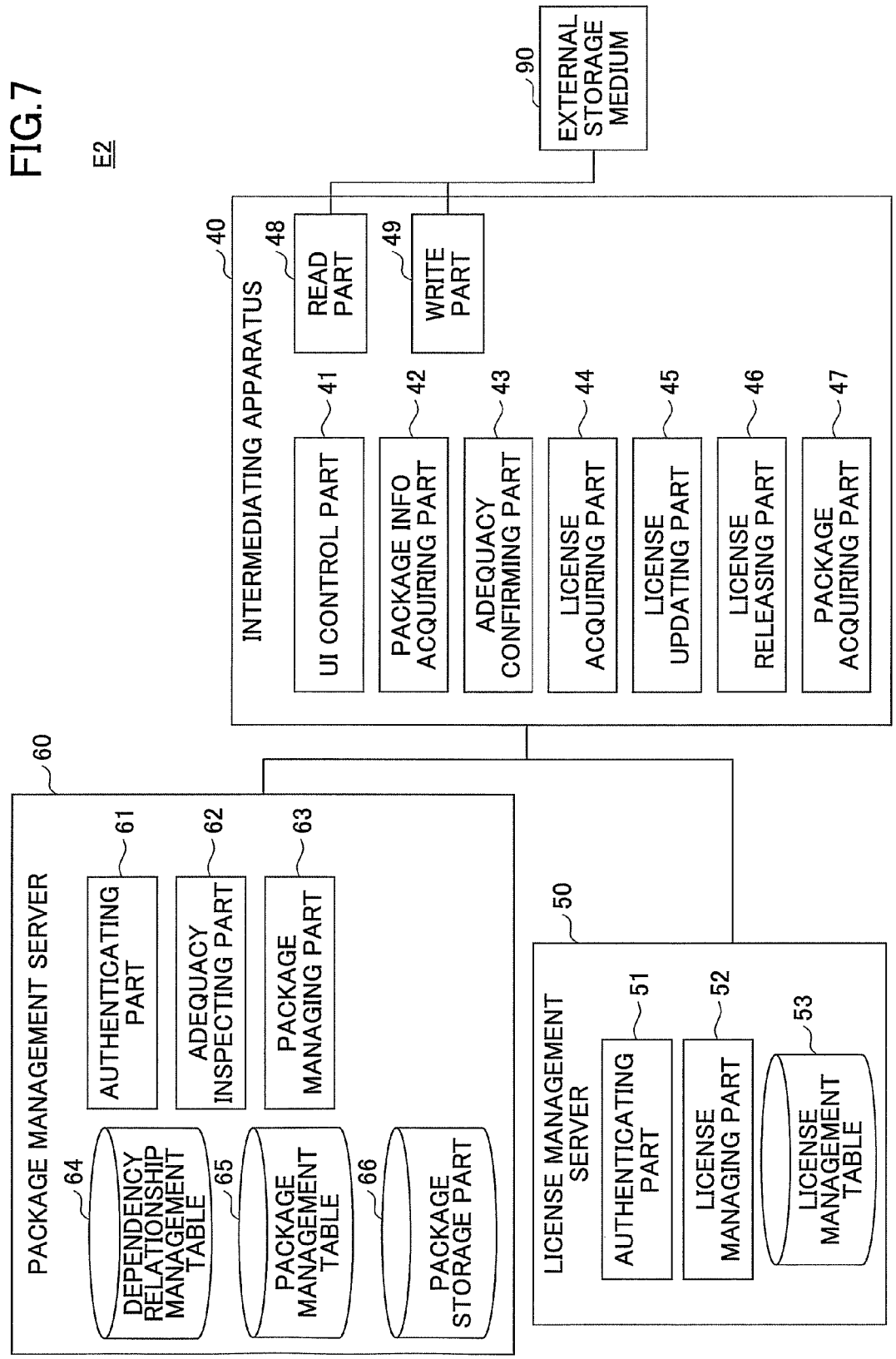

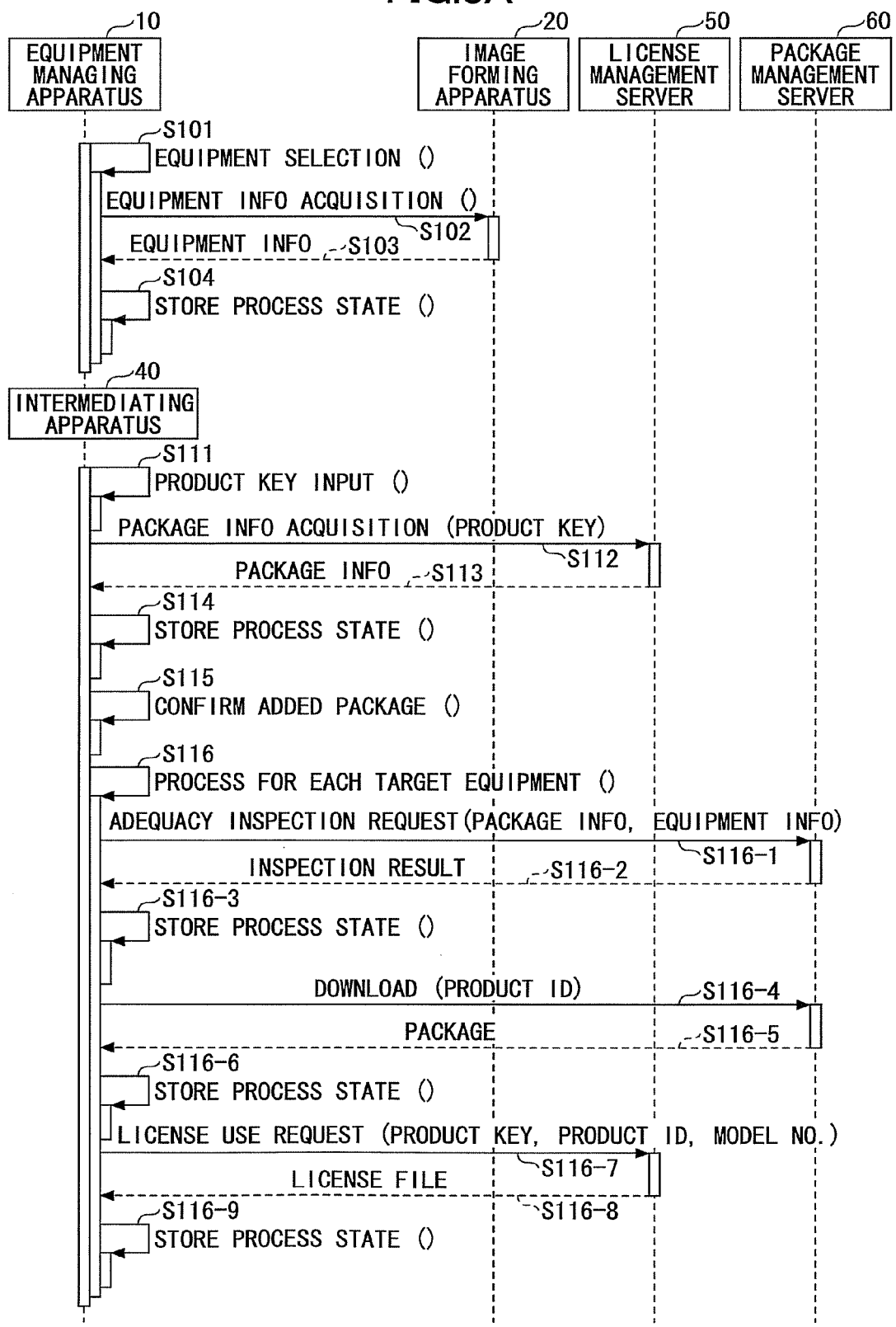

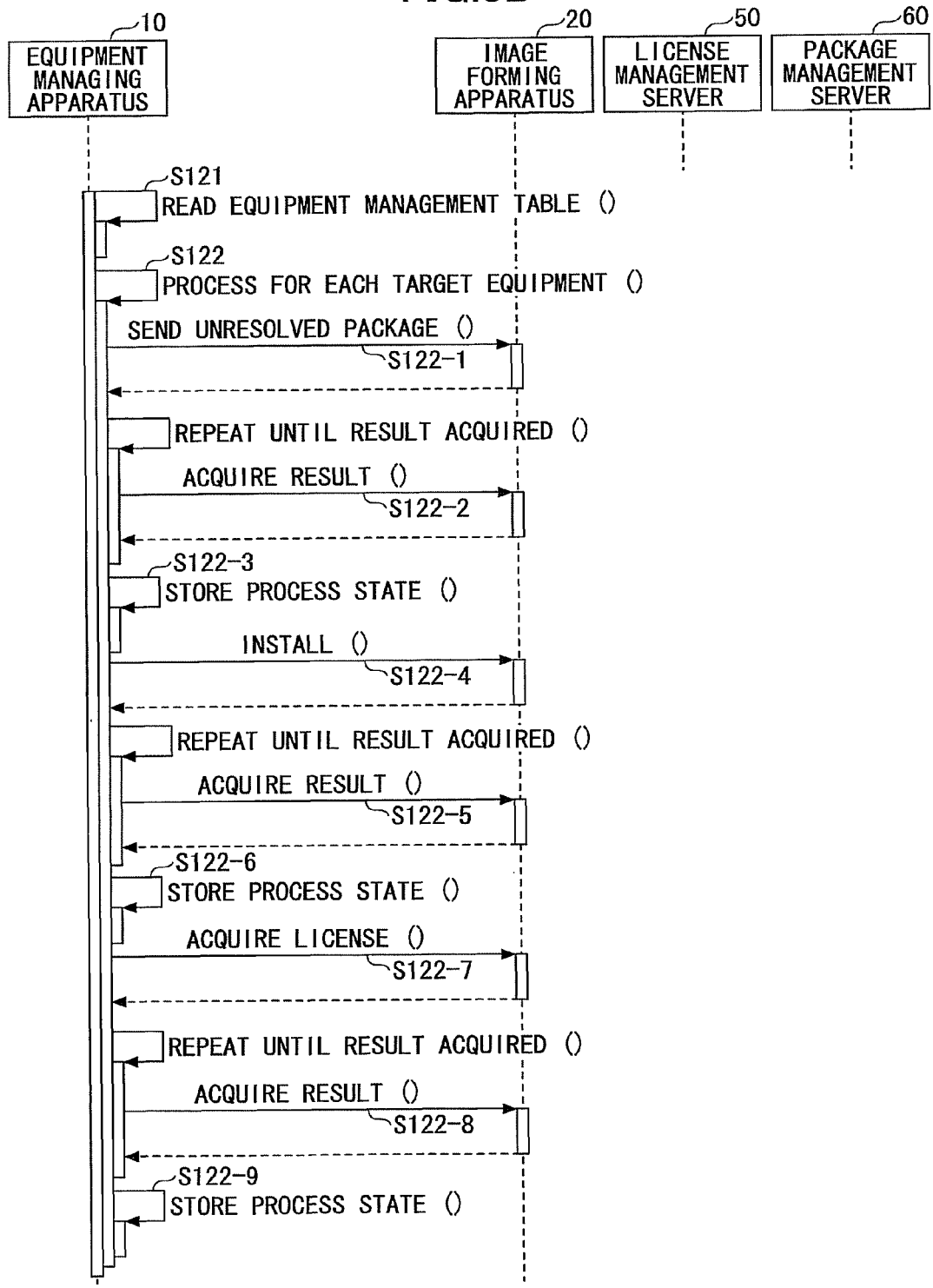

FIG.9

| PRODUCT ID | VERSION | PRODUCT ID OF FUNCTION PACKAGE | LICENSE IMPORT FLAG | TERM OF VALIDITY OF LICENSE |
|---|---|---|---|---|
| ... | ... | ........ | ON (YES) | 2009.1.30 |
| ... | ... | .......... | OFF (NO) | INDEFINITE |
| .. | .. | .. | .. | .. |

| IP ADDRESS | MODEL NO. | EQUIPMENT INFO | ADEQUACY INSPECTION RESULT | WORK STATUS | ... |
|---|---|---|---|---|---|
| ⋮ | ⋮ | ⋮ | | ACQUISITION OF EQUIPMENT INFO COMPLETED | |
| ⋮ | ⋮ | ⋮ | | ACQUISITION OF EQUIPMENT INFO COMPLETED | |
| ⋮ | ⋮ | ⋮ | | ACQUISITION OF EQUIPMENT INFO COMPLETED | |
| ⋱ | ⋱ | ⋱ | | ⋱ | |

FIG.13

| MANAGEMENT NO. | PRODUCT KEY | PRODUCT ID | MODEL NO. | STATUS | LICENSE FORMAT | TERM OF VALIDITY OF LICENSE | LICENSE EXPIRY DATE | LICENSE ISSUE DATE |
|---|---|---|---|---|---|---|---|---|
| 1 | KEY001 | PR0xxx001 | K00001 | CHECK-OUT | LIMITED-TIME LICENSE (SPECIFY TERM) | 1 YEAR | | |
| 2 | KEY001 | PR0xxx001 | K00002 | CHECK-OUT | LIMITED-TIME LICENSE (SPECIFY TERM) | 1 YEAR | | |
| 3 | KEY001 | PR0xxx001 | | CHECK-IN | LIMITED-TIME LICENSE (SPECIFY TERM) | 1 YEAR | | |
| 4 | KEY002 | PR0xxx002 | K00003 | CHECK-OUT | | | | |
| 5 | KEY002 | PR0xxx003 | K00003 | CHECK-OUT | | | | |
| 6 | KEY003 | PR0xxx004 | K00004 | CHECK-OUT | | | | |

53

EQUIPMENT MANAGING SYSTEM, EQUIPMENT MANAGING METHOD, AND COMPUTER-READABLE STORAGE MEDIUM

CROSS-REFERENCE TO RELATED APPLICATIONS

This application claims the benefit of a Japanese Patent Application No. 2009-212455 filed on Sep. 14, 2009, in the Japanese Patent Office, the disclosure of which is hereby incorporated by reference.

BACKGROUND OF THE INVENTION

1. Field of the Invention

The present invention relates to equipment managing systems, equipment managing methods, and computer-readable storage media configured to manage licenses of electronic equipments. The present invention also relates to equipment managing apparatuses, and intermediating apparatuses for use by the equipment managing systems and the equipment managing methods.

2. Description of the Related Art

Recently, image forming apparatuses often referred to as MFPs (Multi-Function Peripherals) or composite apparatuses, are provided with a function that enables development of new applications or installing of newly developed applications, after the image forming apparatuses are forwarded to the user. In such an image forming apparatus, it may be useful for the user if a license for using the new application may be provided in a manner that suits the user, separately from the application entity. It may also promote sales of the application, when viewed from the provider end who provides the application.

However, in a user environment where a relatively large number of image forming apparatuses are used, it may be extremely troublesome to import the license for each of the image forming apparatuses. Hence, a Japanese Laid-Open Patent Publication No. 2008-243179 proposes a license acquiring apparatus that centrally imports the license of the application for each of the image forming apparatuses. But in this case, a license server that issues the license for using the application and the image forming apparatuses that execute the application need to be connected via a network.

In an office environment where the image forming apparatuses are set up, communication with the outside may be blocked in order to prevent viruses from entering the office environment or to prevent information from leaking to the outside from the office environment. In such an office environment, it may be impossible to import the license that is managed in an external network environment.

SUMMARY OF THE INVENTION

Accordingly, it is a general object in one embodiment of the present invention to provide a novel and useful equipment managing system, equipment managing method, and computer-readable storage medium, in which the problem described above may be suppressed.

Another and more specific object in one embodiment of the present invention is to provide an equipment managing system, an equipment managing method, and a computer-readable storage medium, that enable an electronic equipment provided in an environment non-connectable to an external network to acquire a license managed in an external network environment.

According to one aspect of the present invention, there is provided an equipment managing system comprising an intermediating apparatus connectable to a license management apparatus and a program management apparatus via a first network; and an equipment managing apparatus connectable to an electronic equipment via a second network, the license management apparatus storing, in a related manner, a license identifier to identify a license of a program of the electronic equipment, a product identifier of the program, and license state information indicating a state of use of the license of the program related to the license identifier, the program management apparatus storing the program and the product identifier in a related manner, the intermediating apparatus comprising a license identifier accepting part configured to accept an input license identifier related to an install target; a product information acquiring part configured to acquire from the license management apparatus the product identifier related to the input license identifier; a program acquiring part configured to acquire from the program management apparatus the program related to the product identifier acquired by the product information acquiring part; a license acquiring part configured to specify the license identifier and acquire from the license management apparatus a license file corresponding to the license identifier, and to update the license state information related to the license identifier to a value indicating that the license is in use; and a first write part configured to record the program acquired by the program acquiring part and the license file acquired by the license acquiring part in an external storage medium, and the equipment management apparatus comprising a first read part configured to acquire the license file and the program from the external storage medium; an install control part configured to send the program acquired by the first read part to the electronic equipment; and a license import part configured to send the license file acquired by the first read part to the electronic equipment.

According to one aspect of the present invention, there is provided an equipment managing method to be implemented by an equipment managing system including an intermediating apparatus connectable to a license management apparatus and a program management apparatus via a first network, and an equipment managing apparatus connectable to an electronic equipment via a second network, the license management apparatus storing, in a related manner, a license identifier to identify a license of a program of the electronic equipment, a product identifier of the program, and license state information indicating a state of use of the license of the program related to the license identifier, the program management apparatus storing the program and the product identifier in a related manner, the intermediating apparatus executes a process comprising a license identifier accepting procedure to accept an input of a license identifier related to an install target; a product information acquiring procedure to acquire from the license management apparatus the product identifier related to the input license identifier; a program acquiring procedure to acquire from the program management apparatus the program related to the product identifier acquired by the product information acquiring procedure; a license acquiring procedure to specify the license identifier and acquire from the license management apparatus a license file corresponding to the license identifier, and to update the license state information related to the license identifier to a value indicating that the license is in use; and a first write procedure to record the program acquired by the program acquiring procedure and the license file acquired by the license acquiring procedure in an external storage medium, and the equipment management apparatus executes a process comprising a first read procedure to acquire the license file and the program from the external storage medium; an install control procedure to send the program acquired by the first read procedure to the electronic equipment; and a license import procedure to send the license file acquired by the first read procedure to the electronic equipment.

According to one aspect of the present invention, there is provided a computer-readable storage medium which stores a program which, when executed by a computer, causes the computer to execute an equipment managing method in an equipment managing system including an intermediating apparatus connectable to a license management apparatus and a program management apparatus via a first network, and an equipment managing apparatus connectable to an electronic equipment via a second network, the license management apparatus storing, in a related manner, a license identifier to identify a license of a program of the electronic equipment, a product identifier of the program, and license state information indicating a state of use of the license of the program related to the license identifier, the program management apparatus storing the program and the product identifier in a related manner, the program causing the computer to function as the intermediating apparatus by executing a process comprising a license identifier accepting procedure to accept an input of a license identifier related to an install target; a product information acquiring procedure to acquire from the license management apparatus the product identifier related to the input license identifier; a program acquiring procedure to acquire from the program management apparatus the program related to the product identifier acquired by the product information acquiring procedure; a license acquiring procedure to specify the license identifier and acquire from the license management apparatus a license file corresponding to the license identifier, and to update the license state information related to the license identifier to a value indicating that the license is in use; and a first write procedure to record the program acquired by the program acquiring procedure and the license file acquired by the license acquiring procedure in an external storage medium.

Other objects and further features of the present invention will be apparent from the following detailed description when read in conjunction with the accompanying drawings.

BRIEF DESCRIPTION OF THE DRAWINGS

FIG. 3 is a diagram illustrating a structure of an example of sales package information;

FIG. 4 is a diagram illustrating a structure of an example of a function package information;

FIG. 7 is a diagram illustrating a functional structure of an example of each apparatus in a manufacturer environment in one embodiment of the present invention;

FIGS. 8A and 8B are sequence diagrams for explaining procedures of processes of installing a sales package and importing a license;

FIG. 9 is a diagram illustrating a structure of an example of an install information management table;

FIG. 11 is a diagram illustrating a structure of an example of an equipment management table;

FIG. 13 is a diagram illustrating a structure of an example of a license management table;

DESCRIPTION OF THE PREFERRED EMBODIMENTS

Figure 1:
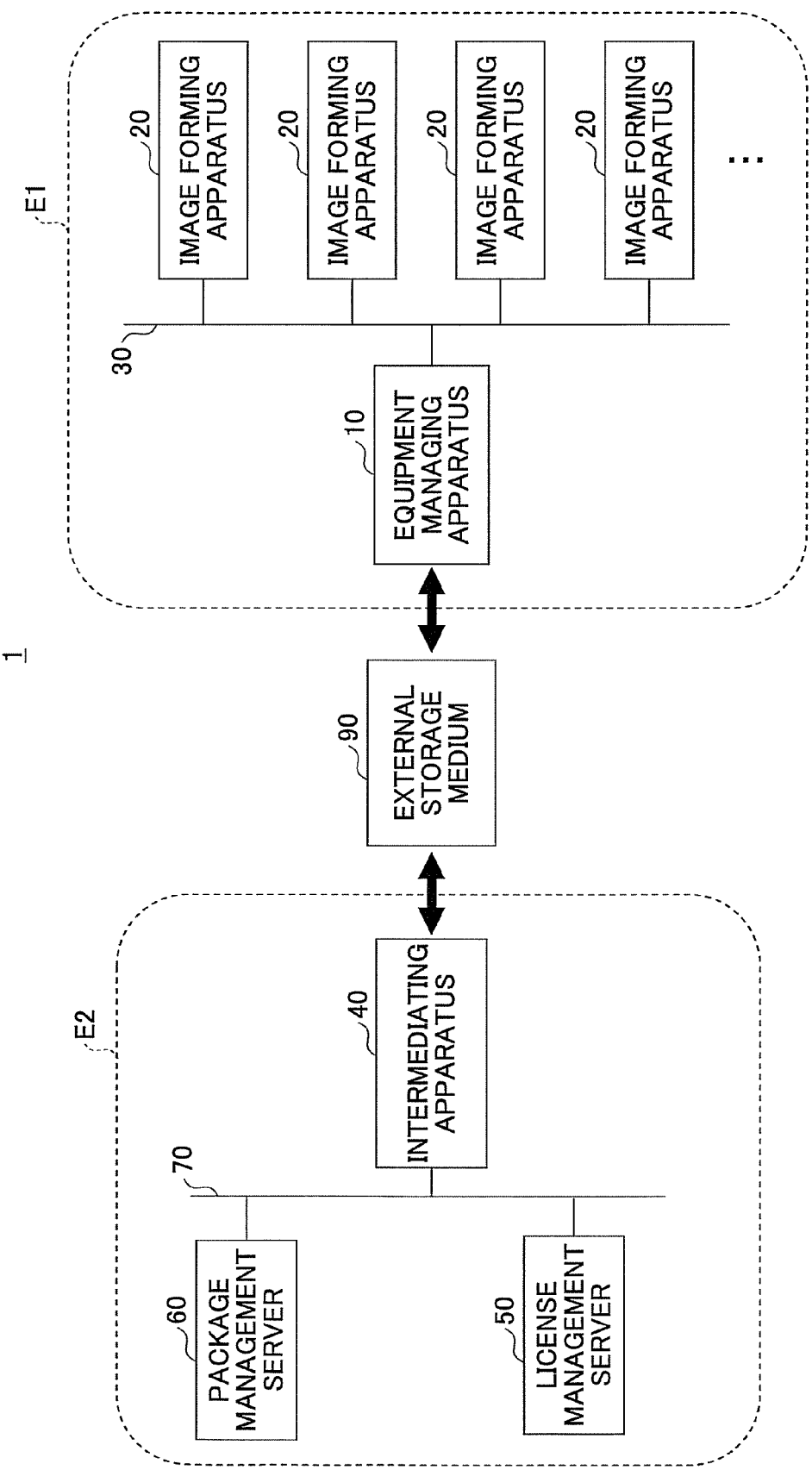
FIG. 1 is a diagram illustrating a system structure of an example of an equipment managing system in one embodiment of the present invention.

A description will be given of embodiments of the equipment managing system, the equipment managing method, and the computer-readable storage medium according to the present invention, by referring to the drawings.

FIG. 1 is a diagram illustrating a system structure of an example of an equipment managing system in one embodiment of the present invention. In an equipment managing system 1 illustrated in FIG. 1, a user environment E1 denotes a system environment of the user (or customer) of an image forming apparatus 20. For example, the user environment E1 corresponds to a company, office or the like of the user of the image forming apparatus 20. In the user environment E1, one or a plurality of image forming apparatuses 20 and an equipment managing apparatus 10 may be connected via a network 30, such as a LAN (Local Area Network). The network 30 may be a cable network, a wireless network, or a combination of cable and wireless networks. The image forming apparatus 20 may be formed by an electronic equipment, such as a MFP (Multi-Function Peripheral) that has a plurality of functions provided within a single housing, such as print, scan, copy, and facsimile functions. The facsimile function may include a facsimile transmission function and a facsimile reception function. However, the image forming apparatus 20 is not limited to the MFP, and may be formed by an electronic equipment which has a single function, such as the print function or the scan function. The image forming apparatus may expand its functions by adding or modifying a program component (hereinafter simply referred to as a "component") thereof.

The equipment managing apparatus 10 may be formed by a computer, such as a PC (Personal Computer), that may import components operable in the image forming apparatuses 20 in the user environment E1 and licenses related to the components. The license of the component may provide a right to use the component. The number of user environments E1 depends on the number of users (or the number of users in units of companies or offices), and thus, a plurality of user environments E1 may exist.

On the other hand, a manufacturer environment E2 denotes a system environment of the vendor of the components to be added to the image forming apparatuses 20. For example, the manufacturer environment E2 may be operated by the manufacturer of the image forming apparatuses 20. In the manufacturer environment E2, an intermediating apparatus 40, a license management server (or license management apparatus) 50, and a package management server (or program management apparatus) 60 are connected via a network 70, such as the LAN or the Internet.

The license management server 50 may be formed by a computer that manages the licenses of the components purchased by the user. The package management server 60 may be formed by a computer that manages the component entity. The intermediating apparatus 40 may be formed by a computer that intermediates the information exchange between the equipment managing apparatus 10 and the license management server 50 or the package management server 60. In this embodiment, there is no network connection between the user environment E1 and the manufacturer environment E2. More particularly, the user environment E1 may be regarded as an off-line environment that is not connected to an external network such as the Internet.

Accordingly, the equipment managing apparatus 10 may not make the information exchange directly with the license management server 50 nor the package management server 60. The intermediating apparatus 40 may indirectly achieve the information exchange between the equipment managing apparatus 10 and the license management server 50 or the package management server 60 by using an external storage medium 90. The information to be transmitted from the equipment managing apparatus 10 to the license management server 50 or the package management server 60 may be recorded onto the external storage medium 90 by the equipment managing apparatus 10. The intermediating apparatus 40 may read the information from the external storage medium 90, and transfer the read information to the license management server 50 or the package management server 60 via the network 70. On the other hand, the information to be transmitted from the license management server 50 or the package management server 60 to the equipment managing apparatus 10 may be transferred to the intermediating apparatus 40 via the network 70. Then, the intermediating apparatus 40 may record the information received via the network 70 onto the external storage medium 90. The equipment managing apparatus 10 may read the information stored in the external storage medium 90, in order to artificially receive (by a pseudo-reception) the information from the license management server 50 or the package management server 60. Hence, the information exchange may be made between the equipment managing apparatus 10 and the license management server 50 or the package management server 60.

The external storage medium 90 may be formed by any suitable storage medium that is readable, writable, and portable. For example, the external storage medium 90 may be formed by a USB (Universal Serial Bus) memory, a SD (Secure Digital) memory card, a CD-RW (Compact Disc-ReWritable) or the like.

In this embodiment, the components are marketed in units called sales packages. In addition, the marketing unit of components may be a set formed by a plurality of sales packages. The set of the plurality of sales packages will hereinafter be referred to as a "group".

Figure 2:
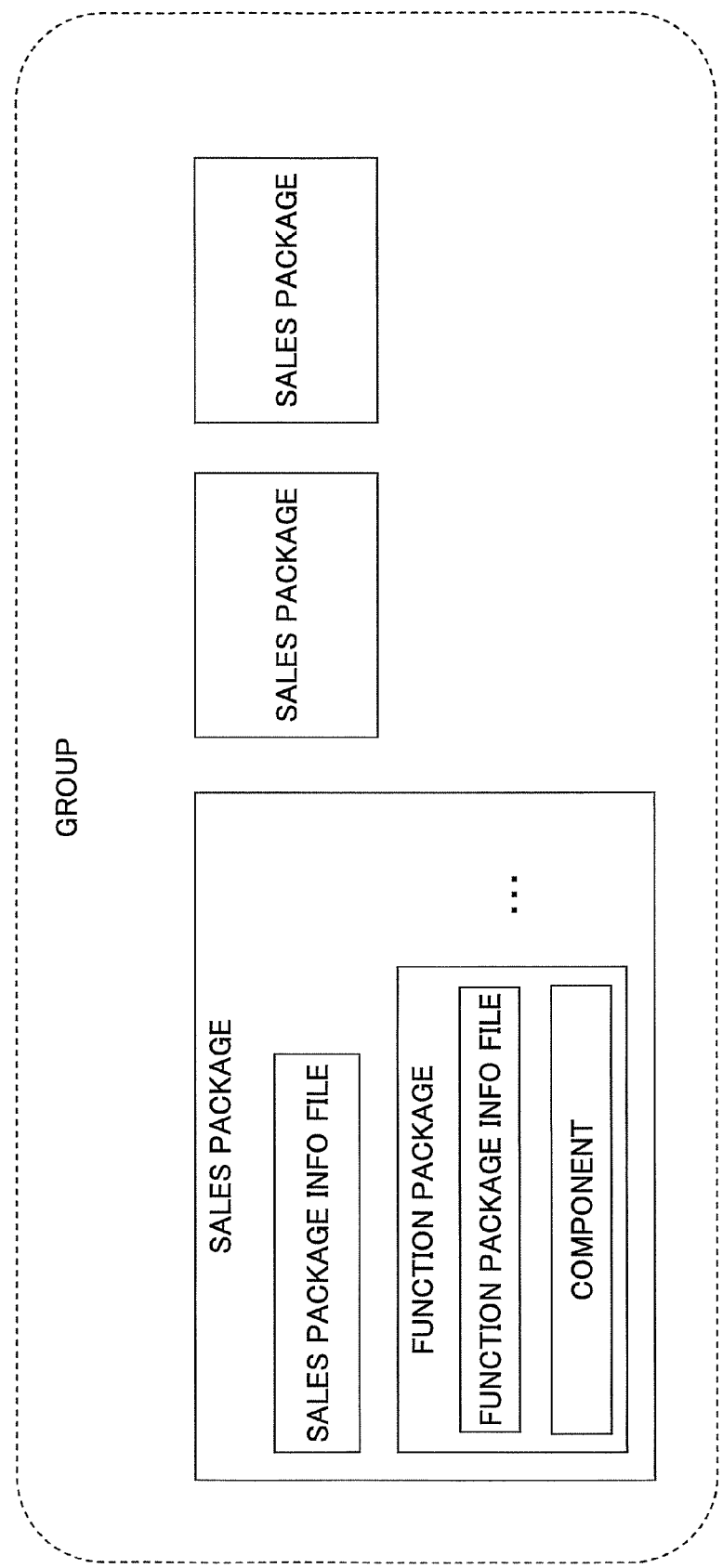
FIG. 2 is a diagram illustrating a structure of an example of a sales package.

FIG. 2 is a diagram illustrating a structure of an example of the sales package. As illustrated in FIG. 2, one sales package is formed by an archive file including one sales package information file, and one or more function packages. The sales package information file may record attribute information (or sales package information) of the sales package.

FIG. 3 is a diagram illustrating a structure of an example of the sales package information. As illustrated in FIG. 3, the sales package information may include a product ID (IDentifier), a version, a name, a description, a vendor name, and the like. The product ID is an identifier that is uniquely allocated to each sales package and each function package. The version indicates a version number of the sales package. The name indicates the sales package name. The description relates to the sales package. The vendor name indicates the vendor (or developer) of the sales package.

Returning now to the description of FIG. 2, the function package is formed by a software package that is packaged in units of functions. One function package is formed by an archive file (for example, JAR (Java (Registered Trademark) ARchive)) file including one function package information file and one component entity. The function package information file may record attribute information (or function package information) of the function package.

FIG. 4 is a diagram illustrating a structure of an example of the function package information. As illustrated in FIG. 4, the function package information may include a product ID, a version, a name, a description, a vendor name, package dependency information, and the like. The product ID is an identifier that is uniquely allocated to the function package. The version indicates a version number of the function package. The name indicates the function package name. The description relates to the function package. The vendor name indicates the vendor (or developer) of the function package.

In the example illustrated in FIG. 2, one group is formed by three sales packages. However, each sales package belonging to the group may be marketed on its own.

Figure 5:
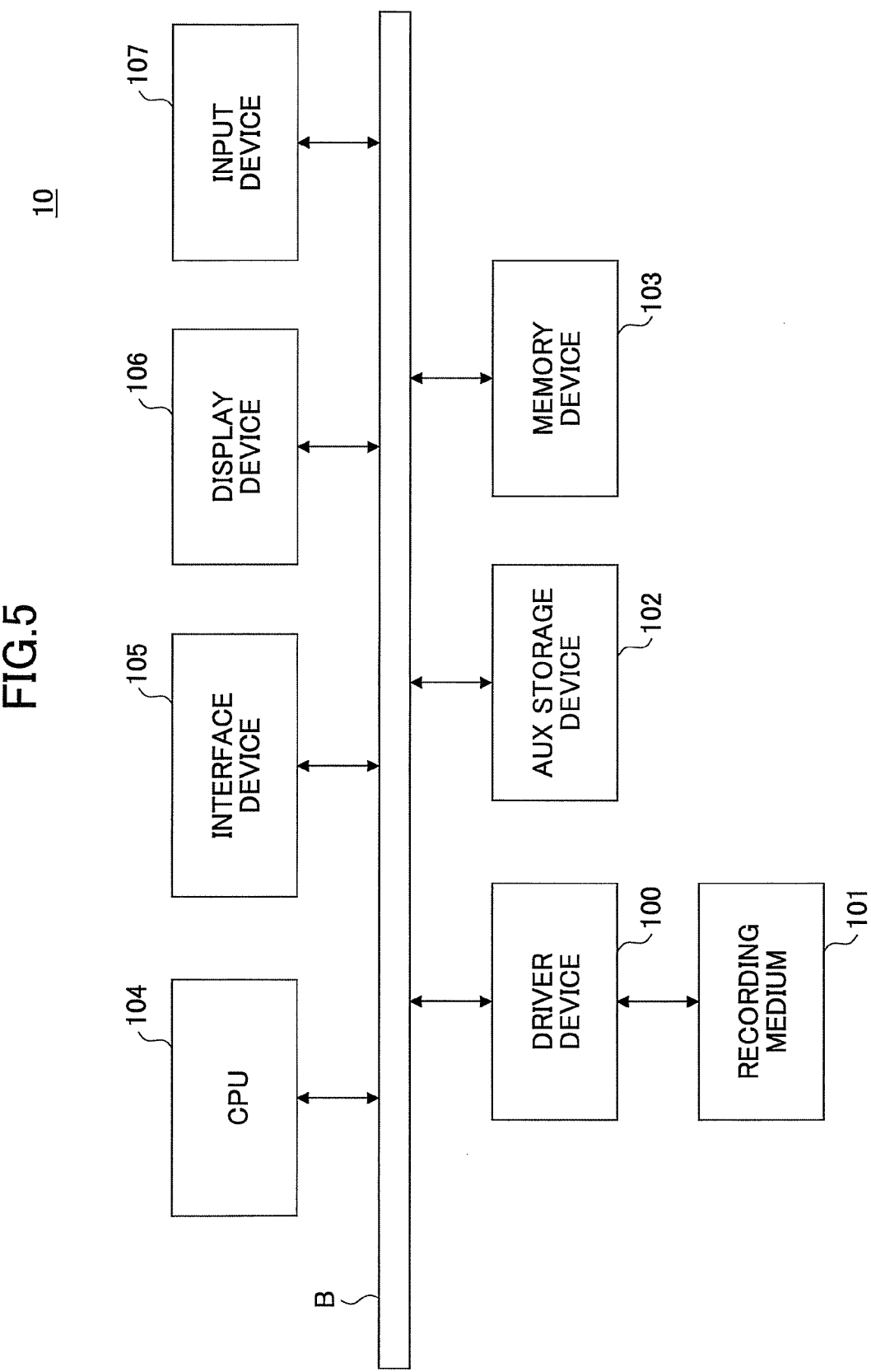
FIG. 5 is a block diagram illustrating a hardware structure of an example of an equipment managing apparatus in one embodiment of the present invention.

FIG. 5 is a block diagram illustrating a hardware structure of an example of the equipment managing apparatus in one embodiment of the present invention. The equipment managing apparatus 10 illustrated in FIG. 5 may include a driver device 100, an auxiliary storage device 102, a memory device 103, a CPU (Central Processing Unit) 104, an interface device 105, a display device 106, and an input device 107 that are connected via a bus B.

The program that causes the computer, such as the CPU 104, to carry out the process of the equipment managing apparatus 10 may be provided in the form of a recording medium 101, such as a CD-ROM (Compact disc-Read Only Memory). When the recording medium 101 recorded with the program is set in the driver device 100, the program may be installed from the recording medium 101 into the auxiliary storage device 102 via the driver device 100. However, it is not essential for the program to be installed from the recording medium 101, and the program may be downloaded from another computer (not illustrated) via a network (not illustrated), for example. The auxiliary storage device 102 may store the program that is installed therein, and files and data that may be necessary.

The program may be read from the auxiliary storage device 102 and stored into the memory device 103 in response to a program boot (or start) instruction. The CPU 104 may carry out the functions of the equipment managing apparatus 10 by executing the program stored in the memory device 103. The interface device 105 may provide an interface that is configured to connect the equipment managing apparatus 10 to a network (not illustrated). The display device 106 may display a GUI (Graphical User Interface) or the like according to the program that is executed by the CPU 104. The input device 107 may be formed by a keyboard, a mouse or the like, and is configured to input various instructions and data when operated by the user.

Each of the intermediating apparatus 40, the license management server 50, and the package management server 60 may have the hardware structure illustrated in FIG. 5. But in the case of the license management server 50 and the package management server 60, the display device 106 and the input device 107 may or may not be provided.

Figure 6:
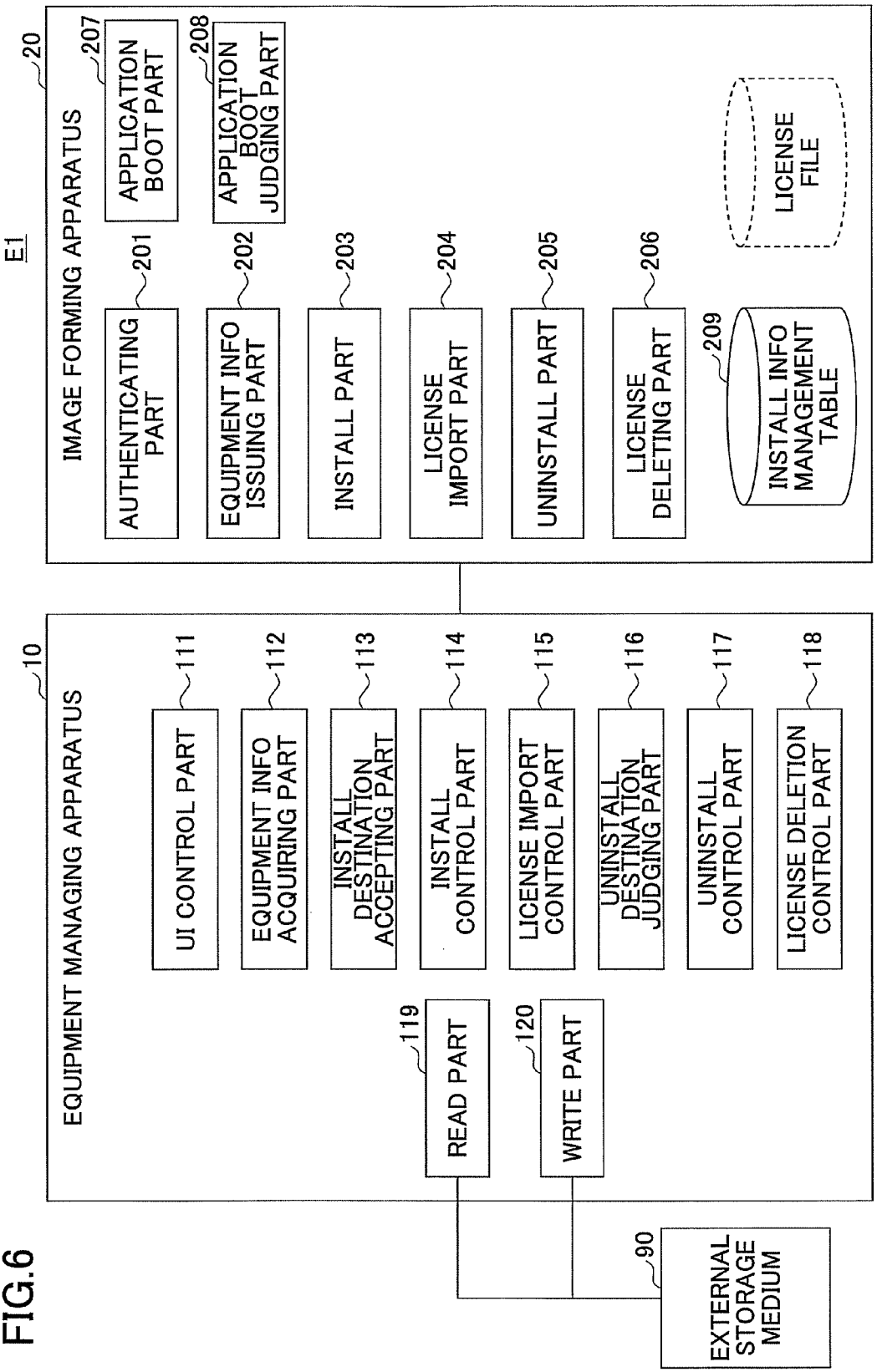
FIG. 6 is a diagram illustrating a functional structure of an example of each apparatus in a user environment in one embodiment of the present invention.

FIG. 6 is a diagram illustrating a functional structure of an example of each apparatus in the user environment in one embodiment of the present invention. In FIG. 6, the image forming apparatus 20 may include an authenticating part 201, an equipment information issuing part 202, an install part 203, a license importing part 204, an uninstall part 205, a license deleting part 206, an application boot part 207, an application boot judging part 208, and an install information management table 209. Each of the parts 201 through 208 may be formed by a CPU of the image forming apparatus 20 when this CPU executes the program installed in the image forming apparatus 20 and carries out corresponding processes.

The authenticating part 201 may authenticate whether the equipment managing apparatus 10 is a correct (or legitimate) access request source, when starting a communication with the equipment managing apparatus 10. The authentication may employ an authentication method such as the BASIC authentication, WSSE authentication, or the like. If the equipment managing apparatus 10 cannot be authenticated as the correct access request source, the authenticating part 201 may cut off (or disable) the communication with the equipment managing apparatus 10.

The equipment information issuing part 202 may return equipment information in response to a request from the equipment managing apparatus 10. The equipment information may include information related to sales packages and firmware installed in the image forming apparatus 20.

The install part 203 may install the sales package or the like in response to a request from the equipment managing apparatus 10. The license importing part 204 may carry out a license file import process in response to a request from the equipment managing apparatus 10. The license file may be recorded with data for certifying the license with respect to the sales package, that is, data giving permission to use the sales package. Hence, in this embodiment, the sales package (or component) may not be used in the image forming apparatus 20 by merely acquiring the sales package entity. The sales package becomes usable in the image forming apparatus 20 when the license file of the sales package is imported by the image forming apparatus 20.

Some components may not require the license file. Such a component, which does not require the license file, may be used in the image forming apparatus 20 when the installing of the component into the image forming apparatus 20 is completed.

The uninstall part 205 may uninstall (or delete) the sales package or the like in response to a request from the equipment managing apparatus 10. The license deleting part 206 may delete the license file which has already been imported by the image forming apparatus 20, in response to a request from the equipment managing part 10. The function package included in the sales package whose license file has been deleted, may not be used in the image forming apparatus 20.

The application boot part 207 may carry out a boot process to boot the function package (or application program). The application boot judging part 208 may judge whether to boot the function package that is a boot target, based on the license file. The install information management table 209 may manage information of the sales packages or the like installed in the image forming apparatus 20, and may be stored in a storage device of the image forming apparatus 20.

On the other hand, the equipment managing apparatus 10 illustrated in FIG. 6 may include a UI (User Interface) control part 111, an equipment information acquiring part 112, an install destination accepting part 113, an install control part 114, a license import control part 115, an uninstall destination judging part 116, an uninstall control part 117, a license deletion control part 118, a read part 119, and a write part 120. Each of the parts 111 through 120 may be formed by the CPU 104 of the equipment managing apparatus 10 when this CPU 104 executes the program installed in the equipment managing part 10 and carries out corresponding processes.

The UI control part 111 may accept input information, including instructions input by the user. The equipment information acquiring part 112 may acquire equipment information from the image forming apparatus 20. The install destination accepting part 113 may accept the image forming apparatus 20 that is specified by the user as an install destination of the sales package. The install control part 114 may send the sales package or the like to the image forming apparatus 20, and control the image forming apparatus 20 to carry out an install process to install therein the sales package or the like. The license import control part 115 may send a license file to the image forming apparatus 20, and control the image forming apparatus 20 to carry out a license import process. The uninstall destination judging part 116 may judge the image forming apparatus 20 installed with the sales package that is an uninstall target. The uninstall control part 117 may control the image forming apparatus to uninstall the sales package that is the uninstall target. The license deletion control part 118 may control the image forming apparatus 20 to carry out a license file deletion process. The read part 119 may read (or acquire) the information recorded in the external storage medium 90. The write part 120 may write (or record) information into the external storage medium 90.

FIG. 7 is a diagram illustrating a functional structure of an example of each apparatus in the manufacturer environment in one embodiment of the present invention. In FIG. 7, the license management server 50 may include an authenticating part 51, a license managing part 52, and a license management table 53. Each of these parts 50 and 51 may be formed by a CPU of the license management server 50 when this CPU executes the program installed in the license management server 50 and carries out corresponding processes.

The authenticating part 51 may authenticate whether the intermediating apparatus 40 is a correct (or legitimate) access request source. The authenticating part 51 may employ an authentication method similar to that employed by the authenticating part 201 described above. If the intermediating apparatus 40 cannot be authenticated as the correct access request source, the authenticating part 51 may cut off (or disconnect) the connection with the intermediating apparatus 40. The license managing part 52 may manage the licenses, including issuing the licenses related to the sales packages, releasing the licenses, and the like, using the license management table 53. The license management table 53 may record states (or statuses) of the licenses of the sales packages, and may be stored in a storage device of the license management server 50.

The package management server 60 may include an authenticating part 61, an adequacy inspecting part 62, a package managing part 63, a dependency relationship management table 64, a package management table 65, and a package storage part 66. Each of the parts 61 through 63 and 66 may be formed by a CPU of the package management server 60 when this CPU executes the program installed in the package management server 60 and carries out corresponding processes.

The authenticating part 61 may authenticate whether the intermediating apparatus 40 is a correct (or legitimate) access request source. The authenticating part 61 may employ an authentication method similar to that employed by the authenticating part 201 described above. If the intermediating apparatus 40 cannot be authenticated as the correct access request source, the authenticating part 61 may cut off (or disconnect) the connection with the intermediating apparatus 40.

The adequacy inspecting part 62 may inspect whether a dependency relationship of the function packages included in the sales package that is the install target may be solved by the function package or the like already installed in the image forming apparatus 20 at the install destination, by referring to the dependency relationship management table 64. More particularly, the adequacy inspecting part 62 may judge whether the function package or the like to which the function package included in the sales package that is the install target depends, is already installed in the image forming apparatus 20.

The package managing part 63 may manage the sales packages recorded in the package storage part 66. For example, the package managing part 63 may acquire a sales package from the package storage part 66 in response to a download request for this sales package, and return the acquired sales package to the request source.

The dependency relationship management table 64 may record information indicating a dependency relationship between the function packages and between the function packages and the firmware. The dependency relationship management table 64 may be stored in a storage device of the package management server 60. The package management table 65 may record relating information that relate the sales packages and the function packages. The package management table 65 may be stored in a storage device of the package management server 60. The package storage part 66 may be formed by a storage region within the storage device of the package management server 60, and may store the entities of the components, such as the sales package and the firmware, in a related manner to the respective product IDs.

The intermediating apparatus 40 may include a UI control part 41, a package information acquiring part 42, an adequacy confirming part 43, a license acquiring part 44, a license updating part 45, a license releasing part 46, a package acquiring part 47, a read part 48, and a write part 49. Each of these parts 41 through 49 may be formed by a CPU of the intermediating apparatus 40 when this CPU executes the program installed in the intermediating apparatus 40 and carries out corresponding processes.

The UI control part 41 may accept input information, including instructions input by the user. The package information acquiring part 42 may acquire from the license management server 50 information related to the sales package that is the install or uninstall target. The adequacy confirming part 43 may control the adequacy inspecting part 62 of the package management server 60 to inspect the adequacy of the installing to the image forming apparatus 20 that is the install destination, with respect to the sales package that is the install target. The license acquiring part 44 may acquire from the license management server 50 the license file related to the sales package that is the install target. The license updating part 45 may acquire from the license management server 50 a license file whose license expiry (or expiration) date has been updated (or extended). The license releasing part 46 may control the license management server 50 to release the license related to the license file that is a delete target. The package acquiring part 47 may download (or acquire) the sales package that is the install target from the package management server 60. The read part 48 may read information recorded in the external storage medium 90. The write part 49 may write and record information into the external storage medium 90.

Next, a description will be given of the procedures of the processes carried out in the equipment managing system 1. First, a description will be given of the processes carried out to install the sales package into the image forming apparatus 20.

FIGS. 8A and 8B are sequence diagrams for explaining procedures of processes of installing the sales package and importing the license. In FIGS. 8A and 8B, it is assumed for the sake of convenience that the user of the image forming apparatus 20 has purchased any one of the merchandises of the sales package, and the user has already acquired a product key of the merchandise.

In this embodiment, the merchandise is formed by the sales package or group, and the contents of the license related to the sales package or group. Hence, even if the sales packages are the same, these sales packages are treated as being different merchandise if the contents of the respective licenses are different. The contents of the license may include the license format, the term of validity of the license, the license volume number, or the like. The license format indicates whether the license related to the sales package belonging to the merchandise is a sell-off license, a limited-time license, a trial license, or the like. The sell-off license permits use of the merchandise indefinitely after being purchased. The limited-time license permits use of the merchandise only for a limited time after being purchased. The trial license permits a trial use of the merchandise for a limited number of times or a limited time, for example. The term of validity of the license is a valid attribute when the license format is the limited-time license or the trial license, and indicates the time (or duration) for which the license is valid. The license volume number indicates the number of volumes of the license. When the merchandise having the license volume number greater than or equal to two is purchased, a volume license is given to permit simultaneous use of the same sales package within a range indicated by the license volume number.

Accordingly, the act of purchasing the merchandise may not only include the user's determination to select the sales package, but may also include the user's determination to select the contents of the license.

The product key is a unique identifier that is issued (or allocated) every time the merchandise is purchased. The product key may be used as the information (or license identifier) for identifying the license (or right to use) with respect to the sales package included in the merchandise, and as the information for authenticating user as the legitimate purchaser of the merchandise. In this embodiment, the product ID and the product key are clearly distinguished from each other. In other words, the product ID identifies each sales package of the merchandise to enable the sales packages to be distinguished from one another, while the product key identifies the act of purchasing the merchandise. Hence, a different product key is issued every time the merchandise is purchased, with respect to the sales packages having the same product ID.

The purchasing format of the merchandise is not limited to a particular format. The merchandise may be purchased through a transaction at a store or, may be purchased through an electronic transaction utilizing a Web site, for example. In the first case, the product key may be adhered or affixed to a CD-ROM or the like that is recorded with the sales package. In the latter case, the product key may be displayed on a Web page after submitting the purchase of the merchandise on the Web site or, notifying the product key by electronic mail.

The operation to install the sales package may first be carried out using the equipment managing apparatus 10 in the user environment E1. The external storage medium 90 is set in a writable manner in the equipment managing apparatus 10.

In a step S101 illustrated in FIG. 8A, the install destination accepting part 113 of the equipment managing apparatus 10 may control the display device 106 to display an equipment selection screen including a list of the image forming apparatuses 20, in order to urge the operator to select the image forming apparatus 20 that is to become the install destination of the sales package. A plurality of image forming apparatuses 20 may be selectable on the equipment selection screen. The equipment selection screen may display the image forming apparatuses 20 whose IP (Internet Protocol) address, host name, and the like are prestored in the auxiliary storage device 102. Alternatively, the equipment information acquiring part 112 may issue a broadcast or the like on the network 30 in order to dynamically search the image forming apparatuses 20 that are connected to the network 30, and display on the equipment selection screen the host name and the like of the image forming apparatuses 20 that are found by the search.

Next, in a step S102, the equipment information acquiring part 112 may send an equipment information acquisition request with respect to each image forming apparatus 20 selected on the equipment selection screen. In a step S103, the equipment information issuing part 202 of each image forming apparatus 20 that receives the equipment information acquisition request may acquire the information recorded in the install information management table 209, and return to the equipment information acquiring part 112 the information that is acquired and a model number of each image forming apparatus 20, as the equipment information. The acquisition of the equipment information is made when the authentication by the authenticating part 201 is successful.

FIG. 9 is a diagram illustrating a structure of an example of the install information management table. The product ID, the version, the product ID of the function package, the license import flag, and the license expiry date are registered in the install information management table 209 illustrated in FIG. 9, for each sales package or firmware.

The product ID of the function package is a list of product IDs of the function packages belonging to the sales package. The license import flag indicates whether the license file related to the sales package has been imported, and indicates YES if ON and NO if OFF, for example. The license expiry date indicates the expiry date of the license issued with respect to the sales package, that is, the expiry date of the license file. The license import flag and the license expiry date related to each function package follow the license import flag and the license expiry date related to the sales package to which each function package belongs.

The contents of the install information management table 209 may be registered when installing the sales package, as will be described later. The equipment information returned in the step S103 may include all information registered in the install information management table 209. In addition, the firmware is a program component located in a layer lower than the function package in the hierarchical structure. In other words, the firmware provides basic functions to the function package compared to the function package. The firmware is embedded in advance in the image forming apparatus 20, and no license needs to be acquired in order to use the firmware. Accordingly, in the install information management table 209, items for the function package, the license import flag, and the license expiry date are invalid with respect to the records related to the firmware. For the sake of convenience, FIG. 9 illustrates an example where the information of the firmware and the information of the sales package are managed by the same install information management table 209, however, the information of the firmware and the information of the sales package may be managed by separate tables.

Next, in a step S104 illustrated in FIG. 8A, the write part 120 may write and store the present process state in the external storage medium 90. More particularly, the write part 120 may record (or generate) in the external storage medium 90 an equipment management table that includes the acquired equipment information for each image forming apparatus 20. As a result, the stored contents of the external storage medium 90 may become as illustrated in FIG. 10, for example.

Figure 10:
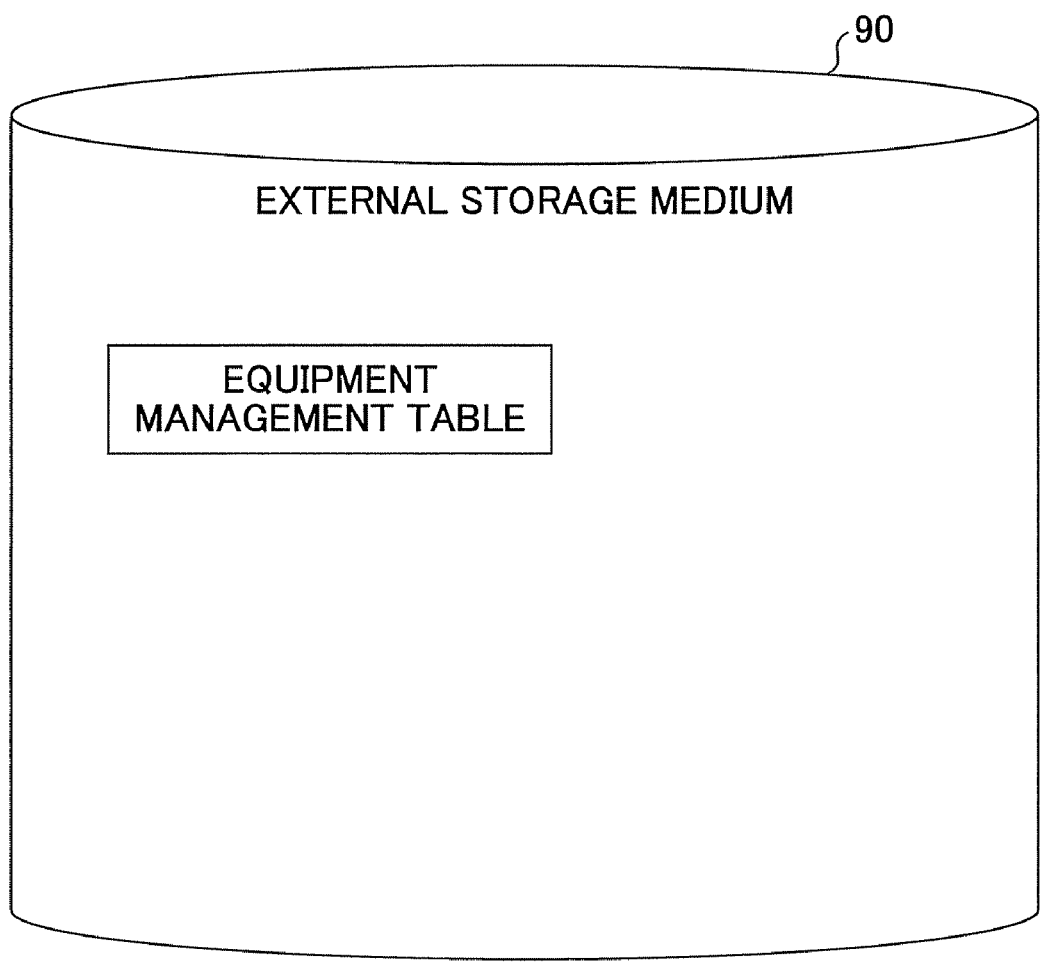
FIG. 10 is a diagram illustrating an example of stored contents in an external storage medium after acquiring equipment information.

FIG. 10 is a diagram illustrating an example of stored contents in the external storage medium after acquiring the equipment information. As illustrated in FIG. 10, the equipment management table is recorded in the external storage medium 90.

The equipment management table recorded in the external storage medium 90 may have a structure illustrated in FIG. 11, for example.

FIG. 11 is a diagram illustrating the structure of an example of the equipment management table. As illustrated in FIG. 11, the equipment management table may have the structure that enables the IP address, the model number, the equipment information, the adequacy inspection result, and the work status to be recorded for each image forming apparatus 20. After acquiring the equipment information, the IP address, the model number acquired based on the IP address, and the equipment information may be recorded in the equipment management table. The adequacy inspection result may provide an item to record the result of the adequacy inspection process which will be described later, for each image forming apparatus 20. The work status may provide an item to record the process state for each image forming apparatus 20. Accordingly, a value indicating that the acquisition of the equipment information is completed ("acquisition of equipment information completed") may be recorded in the work status of the equipment management table with respect to the image forming apparatus 20 acquired the equipment information. However, nothing may be recorded in the work status of the image forming apparatus 20 which failed to acquire the equipment information. Alternatively, a value indicating that the acquisition of the equipment information failed ("acquisition of equipment information failed") may be recorded in the work status of the equipment management table with respect to the image forming apparatus 20 which failed to acquire the equipment information. In this case, the model number and the equipment information of the image forming apparatus 20 which failed to acquire the equipment information may not be registered in the equipment management table. Hence, it is possible to judge whether the acquisition of the equipment information was successful (or failed) for each image forming apparatus 20, by referring to the value recorded in the work status of the equipment management table.

After the above described operation is completed, the operator moves to the manufacturer environment E2. The external storage medium 90 also moves to the manufacturer environment E2 as the operator moves to the manufacturer environment E2. For example, the external storage medium 90 may be carried by the operator to the manufacturer environment E2. Accordingly, in a step S111 and subsequent steps in FIG. 8A, the workplace of the operator becomes the setup location of the intermediating apparatus 40. The external storage medium 90, having the equipment management table recorded by the equipment managing apparatus 10, is set in a readable manner on the intermediating apparatus 40.

In the step S111, the UI control part 41 of the intermediating apparatus 40 may accept input of the product key of the sales package that is the install target (hereinafter referred to as a "current sales package") via a product key input screen that is displayed on the display device by the UI control part 41. Then, in a step S112, the package information acquiring part 42 may specify the input product key and send to the license management server 50 an acquisition request for the package information related to the product key. The package information acquisition request may be sent to the license management server 50 when the authentication by the authenticating part 51 is successful.

Figure 12:
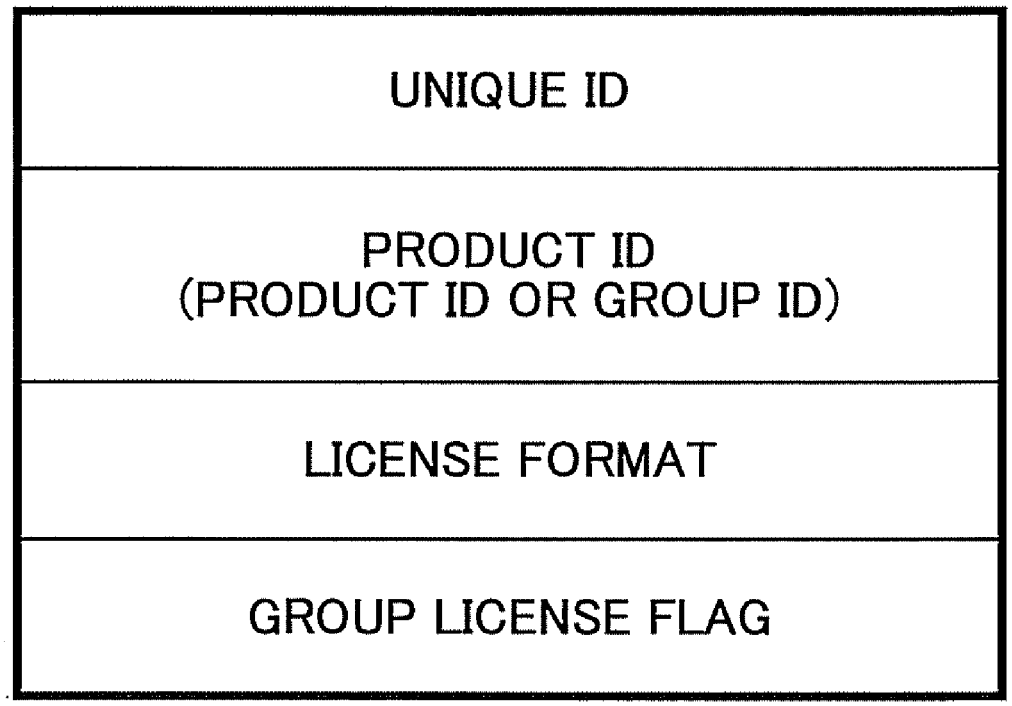
FIG. 12 is a diagram illustrating a structure of an example of a product key.

FIG. 12 is a diagram illustrating a structure of an example of the product key. As illustrated in FIG. 12, the product key may include a unique ID, a merchandise ID, a license format, and a group license flag.

The unique ID is a unique ID that is generated with the generation of the product key. In other words, the uniqueness of the product key may be secured by the unique ID. The merchandise ID indicates the product ID or the group ID of the sales package of the purchased merchandise. The license format indicates the format of the license related to the purchased merchandise. The group license flag is formed by a parameter indicating whether the merchandise ID within the product key is a group ID (true) or not a group ID (false).

The license managing part 52 of the license management server 50 may judge the validity of the product key specified by the package information acquisition result by referring to the license management table 53, in response to the package information acquisition request.

FIG. 13 is a diagram illustrating a structure of an example of the license management table. As illustrated in FIG. 13, the license management table 53 may include, for each license issued with respect to the sales package, items such as a management number, a product key, a product ID, a model number, a status, a license format, a term of validity of the license, a license expiry date, and a license issue date.

Among these items of the license management table 53, values of the management number, the product key, the product ID, the status, the license format, and the term of validity of the license may be recorded in the license management table 53 when the merchandise is purchased. On the other hand, values of the model number, the license expiry date, and the license issue date may be recorded in the license management table 53 depending on the issuance of the license, that is, the issuance of the license file. In addition, the value of the status may be updated depending on the issuance of the license.

The management number may be formed by an identifier (or number) that is uniquely allocated to each record, as the records are generated with respect to the license management table 53. The product key, the product ID, the license format, and the term of validity of the license may be the same as those described above.

The value of the model number registered in the license management table 53 may be the model number of the image forming apparatus 20 that is specified as the equipment to use the sales package when the license file is issued. The model number may be formed by identification information (or equipment identifier) that uniquely identifies each image forming apparatus 20. The status is formed by information indicating the state of the license. In this embodiment, the state of the license may be any one of "no license", "check-out", and "check-in". The "no license" state indicates a state where no license has been issued. The "check-out" state indicates a state where the license is being used. The "check-in" state indicates a state where license has been released, that is, the license is in a usable state but is not being used. The license expiry date indicates an expiry date of the license (or license file) that is computed based on the term of validity of the license when the license file is issued. The license issue date indicates a date when the license (or license file) is issued, and is registered when the license file is issued.

In FIG. 13, the product key and the product ID are the same for the management numbers "1" through "3". It indicates that a merchandise having a product key "KEY001" is related to a volume license having three licenses. The product key is the same but the product ID is different for the management numbers 4 and 5. It indicates that a merchandise having a product key "KEY002" is related to a group license including two kinds of sales packages. The group license indicates the license with respect to the group.

The license managing part 52 may judge that the product key is valid, using the license management table 53 described above, if the record including the received product key is registered in the license management table 53, the status of the record including the product key is not "check-out", and the license expiry date of the record including the product key does not exceed the present point in time (including a case where the value of the license expiry date is not registered), for example. Otherwise, the license managing part 52 may judge that the product key is invalid.

In the case where the license managing part 52 judges that the product key is invalid, the license managing part 52 may return to the package information acquiring part 42 error information indicating that the product key is invalid. In this case, the package information acquiring part 42 may display the error information on the display device, and discontinue the install operation.

On the other hand, in the case where the license managing part 52 judges that the product key is valid, the license managing part 52, in a step S113, may return to the package information acquiring part 42 the information (package information) recorded in the record related to the received product key (that is, the record in the license management table 53). Hence, the package information may include the product ID (that is, the product ID of the current sales package) related to at least the product key. In a case where the product key is related to the group license or the volume license, the information related to a plurality of product IDs (or a plurality of records) is included in the package information.

In a step S114, when the package information is received by the package information acquiring part 42, the write part 49 may write and record the present process state into the external storage medium 90. More particularly, the write part 49 may write and record the product key and the package information into the external storage medium 90. As a result, the stored contents of the external storage medium 90 may become as illustrated in FIG. 14, for example.

Figure 14:
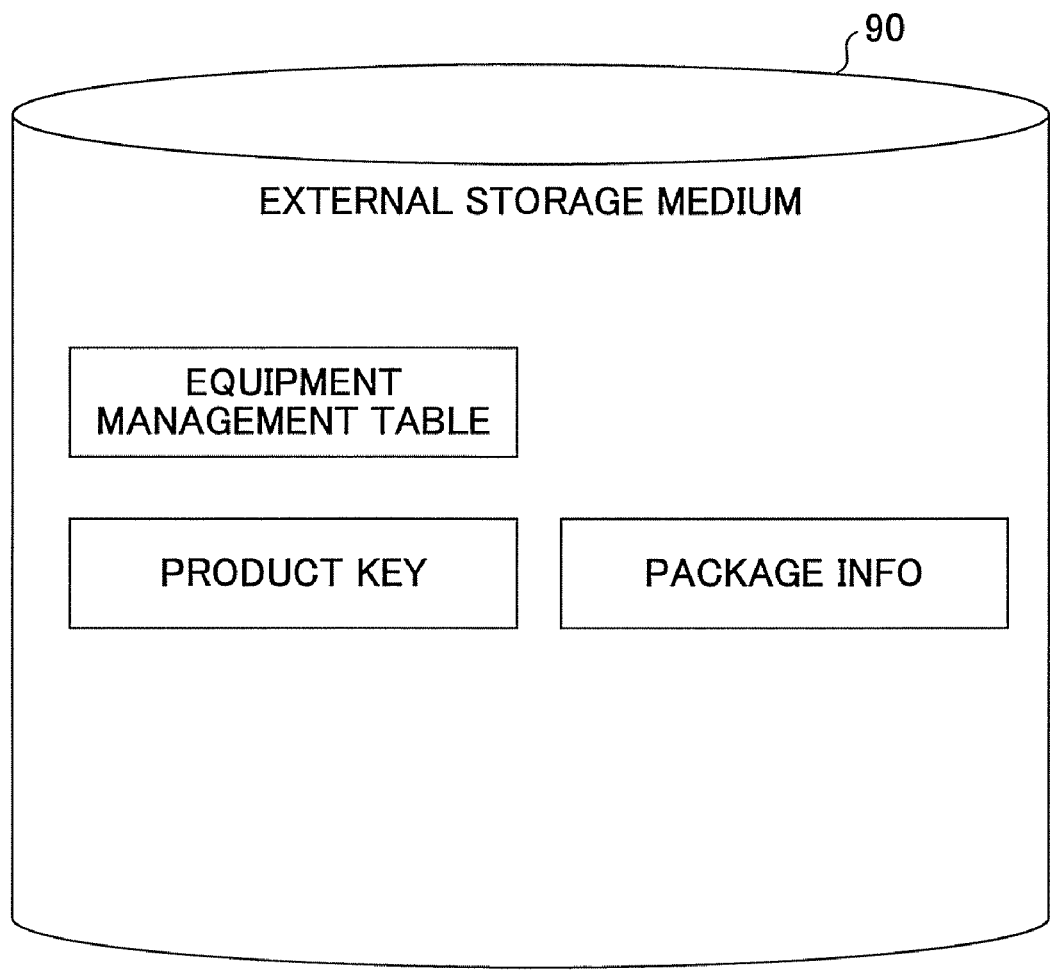
FIG. 14 is a diagram illustrating an example of the stored contents in the external storage medium after acquiring the package information.

FIG. 14 is a diagram illustrating an example of the stored contents in the external storage medium after acquiring the package information. As illustrated in FIG. 14, the equipment management table, the product key, and the package information may be recorded in the external storage medium 90.

Next, in a step S115, the UI control part 41 may display a confirmation screen including the received package information on the display device, and urge the operator to confirm the contents of the current sales package and the contents of the license therefor.

When a continue instruction instructing continuation of the install process is input by the operator, by pushing a confirmation button (or an OK button) on the confirmation screen, a loop process may be carried out for each image forming apparatus 20 whose equipment information is recorded in the equipment management table of the external storage medium 90, in a step S116. The image forming apparatus 20 that is a processing target of the loop process will hereinafter be referred to as a "current equipment".

In a step S116-1, the adequacy confirming part 43 may send to the package management server 60 an adequacy inspection request including the equipment information of the current equipment read by the read part 48 from the equipment management table within the external storage medium 90, and the package information acquired by the package information acquiring part 42. The "adequacy" refers to the adequacy of installing the equipment package included in the current sales package into the current equipment. The adequacy inspection request may be sent when the authentication by the authenticating part 61 is successful. The adequacy inspecting part 62 of the package management server 60 may inspect the adequacy by referring to the dependency relationship management table 64, in response to the adequacy inspection request.

Figure 15:
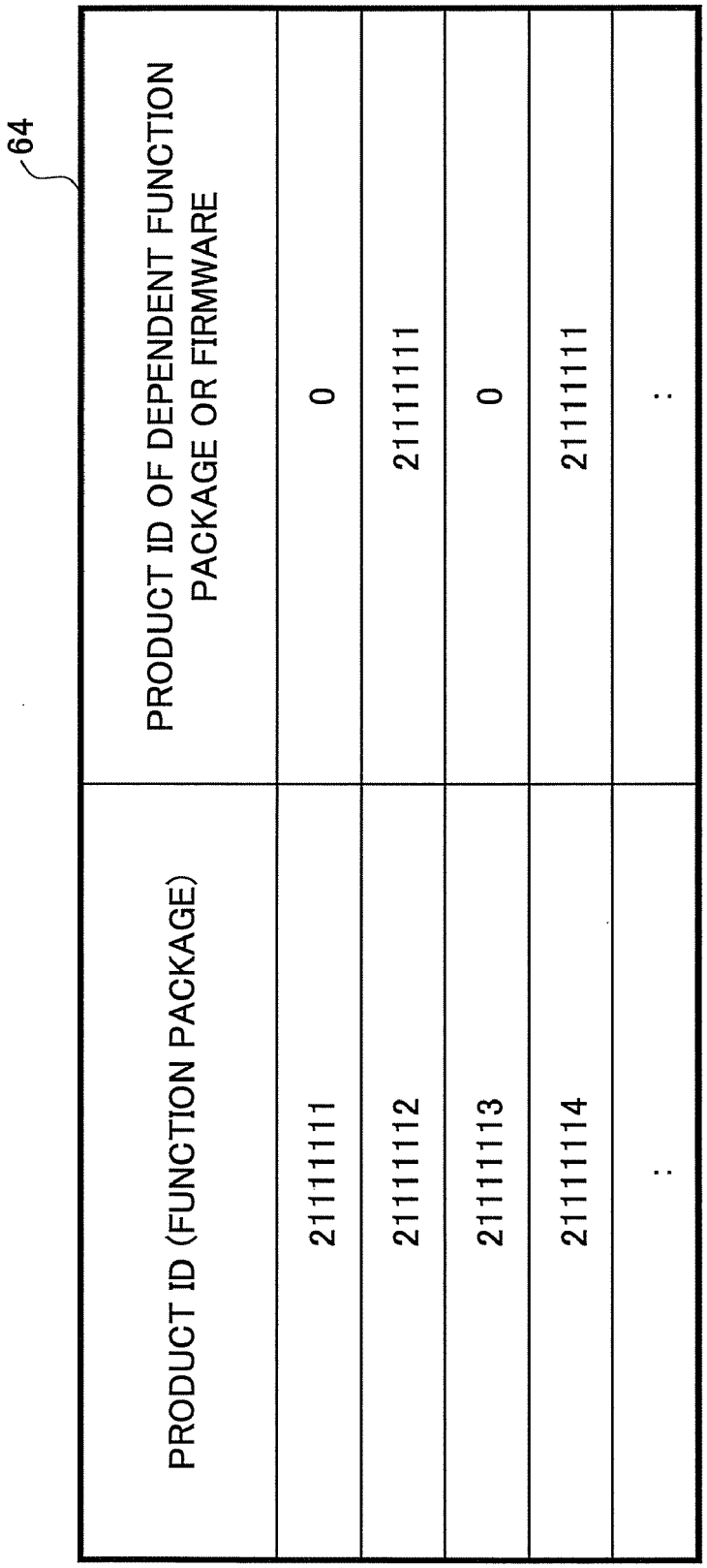
FIG. 15 is a diagram illustrating a structure of an example of a dependency relationship management table.

FIG. 15 is a diagram illustrating a structure of an example of the dependency relationship management table. As illustrated in FIG. 15, the dependency relationship management table 64 may include the product ID of the function package for each function package, and the product ID of the function package or the firmware to which each function package depends (at the destination to which each function package depends). A plurality of product IDs may be registered as the product ID of the function package or the firmware to which the function package depends. In FIG. 15, a value "0" indicates that there is no function package or firmware to which the function package depends.

The adequacy inspecting part 62 may acquire from the package management table 65 a list of product IDs of the function package belonging to the current sales package, when inspecting the adequacy.

Figure 16:
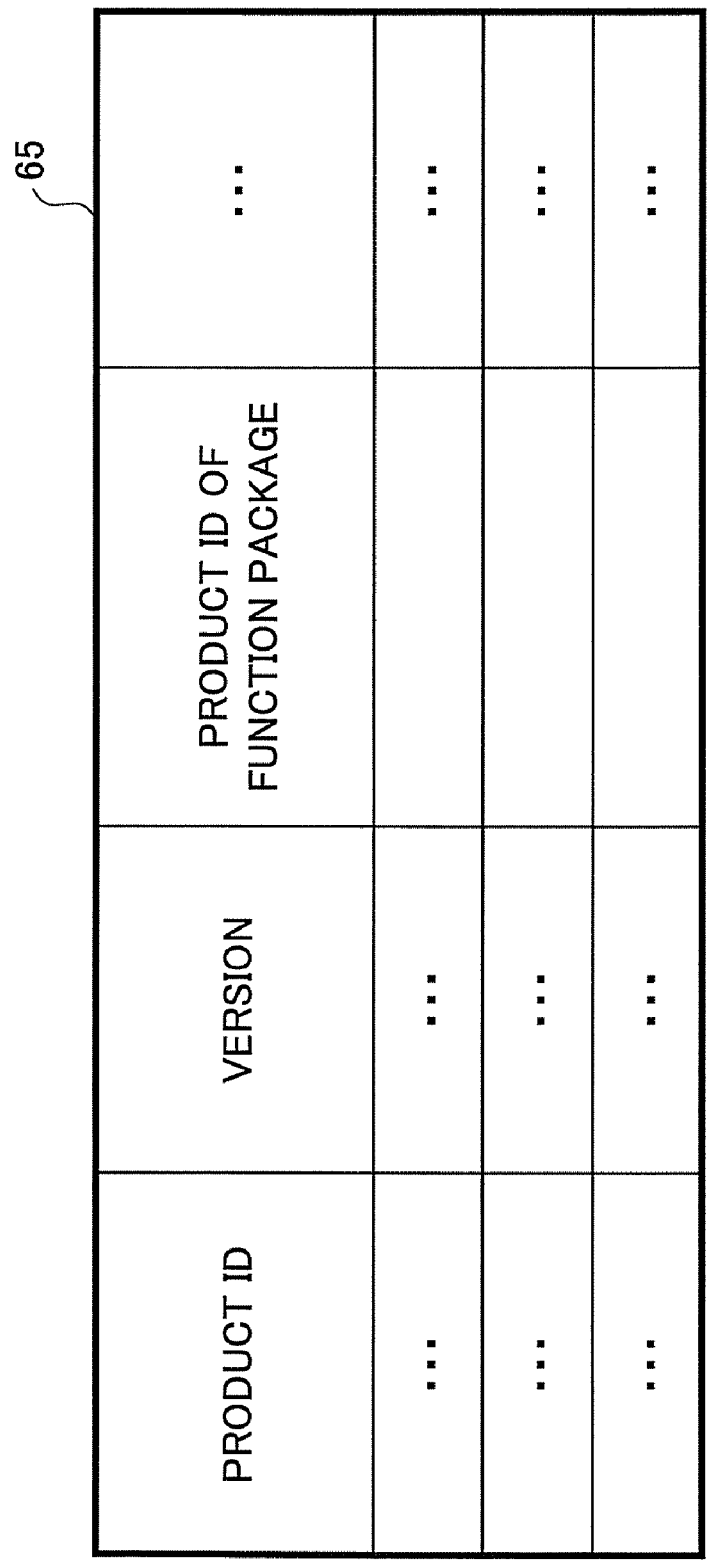
FIG. 16 is a diagram illustrating a structure of an example of a package management table.

FIG. 16 is a diagram illustrating a structure of an example of the package management table. As illustrated in FIG. 16, the package management table 65 may include a product ID, a version, and a product ID of the function package, for each sales package. The product ID of the function package is formed by a list of product IDs of the function packages belonging to the sales package.

Next, the adequacy inspecting part 62 may specify the function package or the firmware (hereinafter referred to as a "depending package") to which the function package depends, based on the product ID of each function package that is acquired and the dependency relationship management table 64. If a depending package exists, a judgement may be made to determine whether the product ID of the depending package is included in the equipment information. If the product ID of all depending packages is included in the equipment information, the adequacy inspecting part 62 may determine that the adequacy exists. On the other hand, if at least one depending package not included in the equipment information exists (hereinafter referred to as an "unresolved package"), the adequacy inspecting part 62 may determine that the adequacy does not exist. A plurality of depending packages may exist with respect to a single function package. In addition, the search for the dependency relationship may be performed recursively.

Next, in a step S116-2, the adequacy inspecting part 62 may return the adequacy inspection result to the adequacy confirming part 43. If the adequacy inspecting part 62 determines that the adequacy does not exist, the adequacy inspection result may include the product ID of the unresolved package.

Then, in a step S116-3, the write part 49 may write and record the present process state into the external storage medium 90. More particularly, the write part 49 may record the adequacy inspection result in the equipment management table, as the value of the adequacy inspection result for the record corresponding to the current equipment. Accordingly, when it is determined that the adequacy does not exist, the product ID of the unresolved package may be recorded in the adequacy inspection result of the corresponding record. In addition, if the adequacy inspection is successful, the write part 49 may update the value of the work status for the corresponding record to a value indicating that the adequacy inspection has been completed (that is, "adequacy inspection complete"). The successful adequacy inspection means that the judgement itself on the adequacy is performed in a normal manner and a judgement result is received, regardless of whether the adequacy exists. On the other hand, if the adequacy inspection fails, nothing may be recorded in the adequacy inspection result of the corresponding record, and the value of the work status for the corresponding record may not updated. In addition, if the adequacy inspection fails, the subsequent processes may not carried out with respect to the current equipment, and the step S116-1 and the subsequent steps may be carried out with respect to the next image forming apparatus 20.

In a step S116-4, the package acquiring part 47 may specify the product ID of the current sales package and send a download request to the package management server 60. In a step S116-5, the package managing part 63 of the package management server 60 may acquire from the package storage part 66 the sales package corresponding to the specified product ID, and return the acquired sales package to the package acquiring part 47. When a plurality of current sales packages exist, the steps S116-4 and S116-5, that is, the downloading may be repeated a plurality of times. In addition, when the adequacy inspection result received in the step S116-2 indicates that the adequacy does not exist, the downloading may also be performed with respect to the unresolved package. When a plurality of current sales packages exist, the product key input in the step S111 may be related to the group license or, a plurality of product keys may be input in the step S111.

Next, in a step S115-6, the write part may write and record the present process state into the external storage medium 90. More particularly, the write part 49 may record the acquired sales package or unresolved package into the external storage medium 90 by relating the acquired sales package or unresolved package to the current equipment. The method of relating the acquired sales package or unresolved package to the current equipment is not limited to a particular method. In this embodiment, the acquired (or downloaded) sales package or unresolved package is stored within a single archive file (hereinafter referred to as a "package archive file"), and the model number of the current equipment is included in the file name of the package archive file, in order to relate the acquired sales package or unresolved package to the current equipment. As another example of the method of relating the acquired sales package or unresolved package to the current equipment, a folder having the model number of the current equipment as the folder name thereof may be created, and the downloaded sales package or unresolved package may be stored within this folder. As a result, the stored contents of the external storage medium 90 become as illustrated in FIG. 17, for example.

Figure 17:
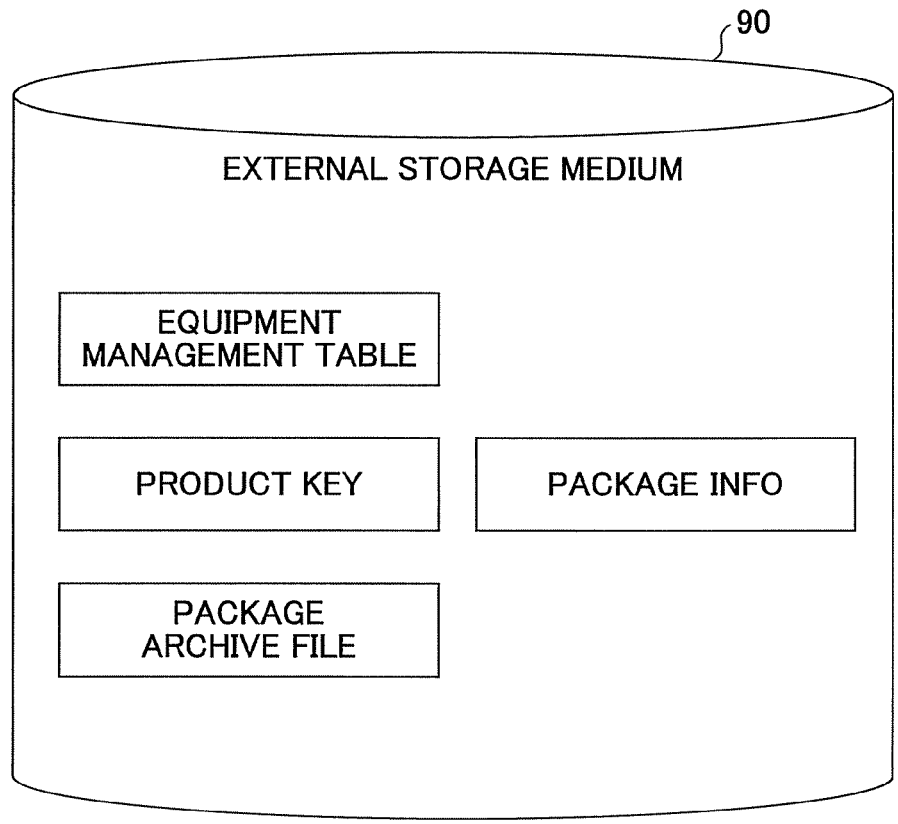
FIG. 17 is a diagram illustrating an example of the stored contents in the external storage medium after downloading the sales package.

FIG. 17 is a diagram illustrating an example of the stored contents in the external storage medium after downloading the sales package. As illustrated in FIG. 17, the external storage medium 90 may be recorded with the package archive file, in addition to the equipment management table, the product key, and the package information.

In the case where the downloading of all sales packages or unresolved packages, that are downloading targets, is successful, the value of the work status for the record corresponding to the current equipment in the equipment management table may be updated to a value indicating that the downloading (or acquisition) of the sales package is completed ("package acquisition complete").

On the other hand, if the downloading of one of the sales packages or unresolved packages fails, the value of the work status for the record corresponding to the current equipment may not be updated in the equipment management table, and the subsequent processes may not be carried out with respect to the current equipment. Hence, the step S116-1 and the subsequent steps may be carried out with respect to the next image forming apparatus 20.

Next, in a step S116-7, the license acquiring part 44 may specify the product key input in the step S111, the product ID of the current sales package, and the model number of the current equipment, and send a license use request (or request to issue a license file) to the license management server 50.

In a step S116-8, the license managing part 52 of the license management server 50 may generate a license file based on the information included in the license use request and the license management table 53, and return the generated license file to the license acquiring part 44.

Figure 18:
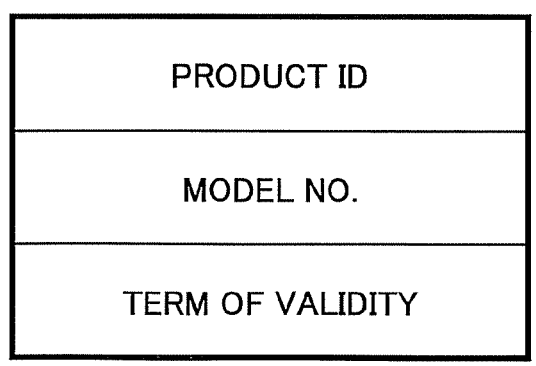
FIG. 18 is a diagram illustrating a structure of an example of a license file.

FIG. 18 is a diagram illustrating a structure of an example of the license file. As illustrated in FIG. 18, the license file may include a product ID, a model number, and a license expiry date. The product ID indicates the product ID of the sales package that is given the license (given permission to use) by the license file. The model number indicates the model number of the image forming apparatus 20 that is permitted to use the sales package related to the product ID, by the license file. The license expiry date indicates the expiry date of the license file, that is, the expiry date of the license provided by the license file.

The product ID related to the product key that is included in the license use request may be registered in the product ID of the license file. In a case where the product key relates to a group license, that is, if a plurality of different product IDs are registered in the license management table 53 with respect to the product key, the license managing part 52 may generate the license file for each sales package. Hence, even in the case of the group license, the product ID of the sales package and not the group ID may be registered in the product ID of the license file. The license management table 53 may be updated when the license file is issued, as will be described later.

The model number included in the license use request may be registered in the model number of the license file. The time (for example, year, month and date) obtained by adding the term of validity of license registered in the license management table 53 with respect to the product key and the product ID included in the license use request may be registered in the license expiry date.

Next, in a step S116-9, the write part 49 may write and record the present process state into the external storage medium 90. More particularly, the write part 49 may record the acquired license file into the external storage medium 90 by relating the acquired license file to the current equipment. In this embodiment, the acquired license file is stored within a single archive file (hereinafter referred to as a "license archive file"), and the model number of the current equipment is included in the file name of the license archive file, in order to relate the acquired license file to the current equipment. However, the method of relating the acquired license file to the current equipment is not limited to such a method, and the acquired license file may be related to the current equipment by other methods, similarly to the case of relating the acquired sales package to the current equipment. As a result, the stored contents of the external storage medium 90 become as illustrated in FIG. 19, for example.

Figure 19:
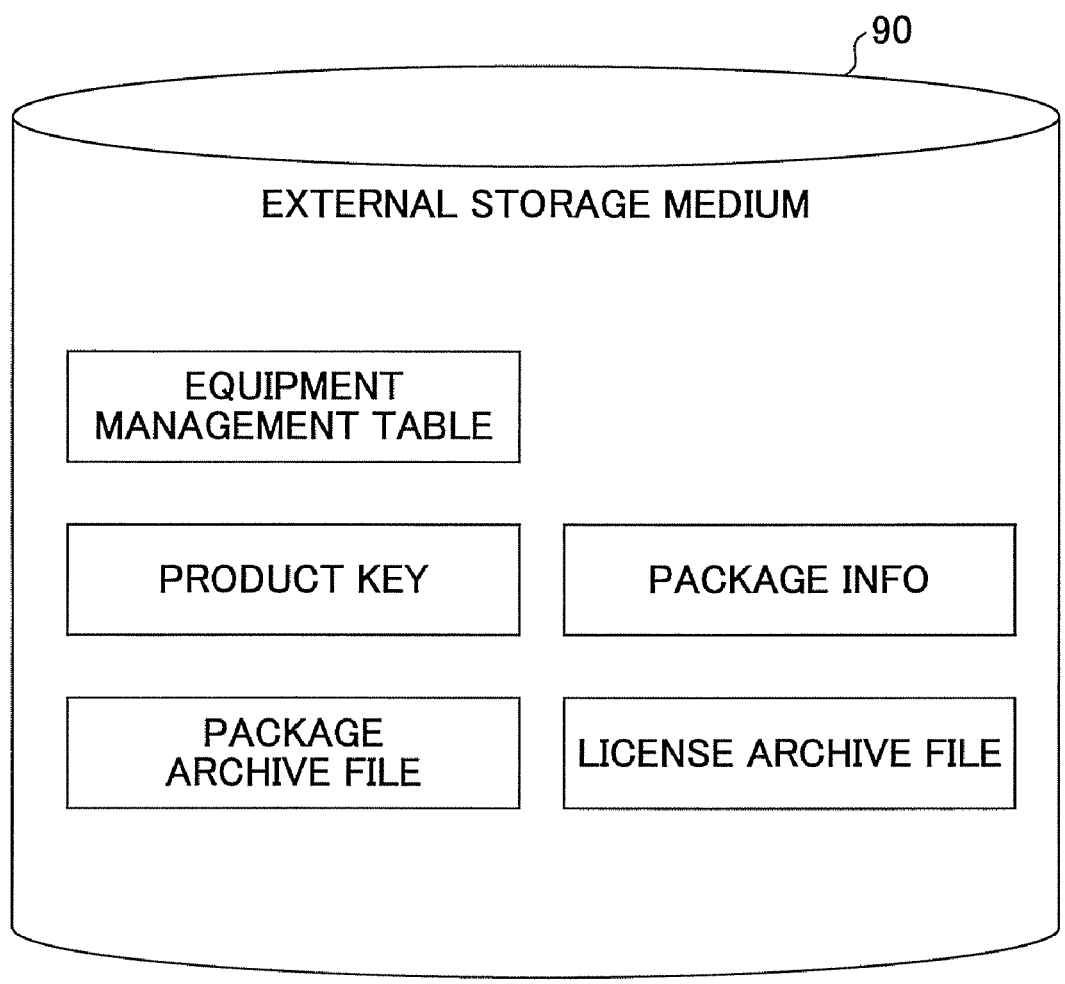
FIG. 19 is a diagram illustrating an example of the stored contents of the external storage medium after acquiring the license file.

FIG. 19 is a diagram illustrating an example of the stored contents of the external storage medium after acquiring the license file. As illustrated in FIG. 19, the external storage medium 90 may be recorded with the license archive file, in addition to the equipment management table, the product key, the package archive file, and the package information.

In the case where the downloading of the license file is successful, the value of the work status for the record corresponding to the current equipment in the equipment management table may be updated to a value indicating that the downloading (or acquisition) of the license file is completed ("license acquisition complete").

On the other hand, if the downloading of the license file fails, the value of the work status for the record corresponding to the current equipment may not be updated in the equipment management table, and the subsequent processes may not be carried out with respect to the current equipment. Hence, the step S116-1 and the subsequent steps may be carried out with respect to the next image forming apparatus 20.

The operation in the manufacturer environment E2 may be completed by the processes described heretofore. Next, the operator moves to the user environment E1. The external storage medium 90 also moves to the user environment E1 as the operator moves to the user environment E1. For example, the external storage medium 90 may be carried by the operator to the user environment E1. Accordingly, in a step S121 and subsequent steps in FIG. 8B, the workplace of the operator becomes the setup location of the equipment managing apparatus 10. The external storage medium 90 in the state having the storage contents illustrated in FIG. 19 is set in a readable manner on the equipment managing apparatus 10.

In the step S121 illustrated in FIG. 8B, the read part 119 of the equipment managing apparatus 10 may acquire the equipment management table from the external storage medium 90 in response to setting of the external storage medium 90 on the equipment managing apparatus 10. Then, a loop process may be carried out for each image forming apparatus 20 whose work status has the value indicating "license acquisition complete" in the equipment management table of the external storage medium 90, in a step S122. Hence, the image forming apparatus 20 for which the process was discontinued in the manufacturer environment E2 may not be regarded as a processing target in the user environment E1. The image forming apparatus 20 that is a processing target of the loop process will hereinafter be referred to as a "current equipment".

In a step S122-1, the install control part 114 may read the package archive file corresponding to the current equipment from the external storage medium 90 via the read part 119, and send to the current equipment the install request including the unresolved package stored in the package archive file. The install part 203 of the current equipment may install the unresolved package, and record the information (product ID or the like) of the unresolved package into the install information management table 209.

Next, in a step S122-2, the install control part 114 may make an inquiry on the install result of the unresolved package to the current equipment. The inquiry (or polling) may be repeated until the installing of the unresolved package is completed in the current equipment and the install result is returned from the current equipment.

Then, in a step S122-3, the write part 120 may write and record the present process state into the external storage medium 90. More particularly, if the installing of the unresolved package is successful, the write part 120 may update the value of the work status for the record corresponding to the current equipment in the equipment management table to a value indicating that the installing of the unresolved package is completed ("installing of unresolved package complete"). On the other hand, if the installing of the unresolved package fails, the value of the work status for the record corresponding to the current equipment in the equipment management table may not be updated, and the subsequent processes may not be carried out with respect to the current equipment. Hence, the step S122-1 and the subsequent steps may be carried out with respect to the next image forming apparatus 20.

The unresolved package is installed first, in order to avoid failure to install the sales package due to the component at the depending destination not being installed.

Next, in a step S122-4, the install control part 114 may send the sales package stored in the package archive file corresponding to the current equipment to the current equipment, and request the current equipment to install the sales package. The install part 203 of the current equipment may install the sales package, and record the information (product ID or the like) of the sales package into the install information management table 209.

Then, in a step S122-5, the install control part 114 may make an inquiry on the install result of the sales package to the current equipment. The inquiry (or polling) may be repeated until the installing of the sales package is completed in the current equipment and the install result is returned from the current equipment.

Next, in a step S122-6, the write part 120 may write and record the present process state into the external storage medium 90. More particularly, if the installing of the sales package is successful, the write part 120 may update the value of the work status for the record corresponding to the current equipment in the equipment management table to a value indicating that the installing of the sales package is completed ("installing of sales package complete"). In this case, the package archive file related to the current equipment may be deleted from the external storage medium 90.

On the other hand, if the installing of the sales package fails, the value of the work status for the record corresponding to the current equipment in the equipment management table may not be updated. In addition, the package archive file related to the current equipment may not be deleted from the external storage medium 90. Furthermore, the subsequent processes may not be carried out with respect to the current equipment. Hence, the step S122-1 and the subsequent steps may be carried out with respect to the next image forming apparatus 20.

Next, in a step S122-7, the license import control part 115 may read the license archive file corresponding to the current equipment from the external storage medium 90 via the read part 119, and send to the current equipment a license import request including the license file stored in the license archive file. The license importing part 204 of the current equipment may record the license file in a predetermined storage region, for example, and put the license file in a usable state.

Then, in a step S122-8, the license import control part 115 may make an inquiry on the license import result of the sales package to the current equipment. The inquiry (or polling) may be repeated until the recording of the license file into the predetermined storage region is completed in the current equipment and the license acquisition result is returned from the current equipment.

Next, in a step S122-9, the write part 120 may write and record the present process state in the external storage medium 90. More particularly, if the license import is successful, the write part 120 may update the value of the work status for the record corresponding to the current equipment in the equipment management table to a value indicating that the license import is completed ("license import complete"). In this case, the license archive file related to the current equipment may be deleted from the external storage medium 90.

On the other hand, if the license import fails, the value of the work status for the record corresponding to the current equipment in the equipment management table may not be updated. In addition, the license archive file related to the current equipment may not be deleted from the external storage medium 90.

The installing of the sales package and the license import process with respect to the image forming apparatus 20 may be completed by the processes described heretofore.

Next, a description will be given of a process carried out by the license managing part 52 of the license management server 50 in response to the license use request in the step S116-7 illustrated in FIG. 8A.

Figure 20:
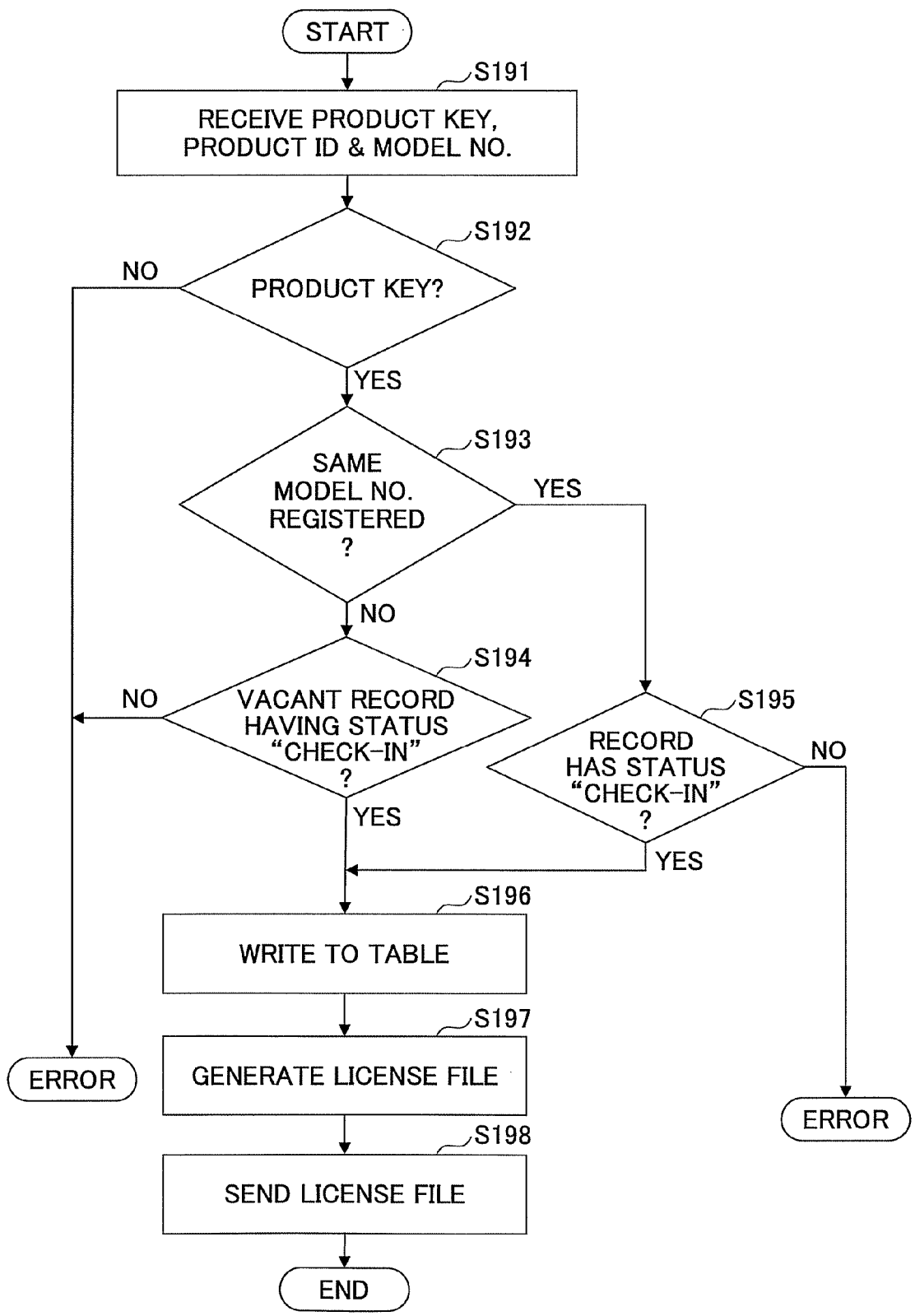
FIG. 20 is a flow chart for explaining procedures of a license file generating process carried out by a license management part.

FIG. 20 is a flow chart for explaining procedures of a license file generating process carried out by the license management part. For the sake of convenience, a single product key is regarded as the processing target in FIG. 20. Accordingly, when a plurality of product keys are received, a step S192 and subsequent steps are carried out for each product key.

In a step S191 (corresponding to the step S116-7 in FIG. 8A), the license managing part 52 may receive from the license acquiring part 44 a license use request including the product key, the product ID, and the model number. Then, the license managing part 52 may judge whether to permit the use of the license related to the product key. More particularly, in the step S192, the license managing part 52 may decide whether the received product key is registered in the license management table 53. If the decision result in the step S192 is YES, the license managing part 52 may decide whether a model number identical to the received model number is registered in the license management table 53 with respect to the product key, in a step S193. If the decision result in the step S193 is NO, the license managing part 52 may decide whether a vacant record having the status "check-in" exists in the license management table 53 among the records related to the product key and the received product ID, in a step S194. If the decision result in the step S194 is YES, the license managing part 52 may record the received model number with respect to the record found in the step S194, and update the status of this record to "check-out", in a step S196. In other words, it may be recorded that the license corresponding to the product key is used. In addition, if the "term of validity of license" is recorded in the record (that is, the record corresponds to a limited-time license), the license managing part 52 may record a date (or date and time) that is obtained by adding the term of validity of the license to the present date (or present date and time) in the record as the license expiry date.

Next, in a step S197, the license managing part 52 may generate a license file illustrated in FIG. 18, for example, including the product ID, the model number, and the license expiry date in the record. The license file may be generated for each record of the license management table 53, that is, for each license with respect to the sales package. Then, in a step S198, the license managing part 52 may return the generated license file to the license acquiring part 44 of the equipment managing apparatus 10.

On the other hand, if the decision result in the step S193 is YES, the license managing part 52 may decide whether the record has the status "check-in", in a step S195. If the decision result in the step S195 is YES, the process advances to the step S196 described above.

On the other hand, if the decision result in any of the steps S192, S194, and S195 is NO, the license managing part 52 may detect an error, and may not generate the license file. In other words, the license managing part 52 may not issue the license when the error is detected.

In the image forming apparatus 20, the license file may be executed when booting the function package included in the installed sales package. The application boot judging part 208 may utilize the license file when making a license check. In other words, the application boot judging part 208 may permit the booting of the function package provided that a corresponding license file exists in the sales package belonging to the function package that is the boot target, the model number of the license file matches the model number of the image forming apparatus 20 that is to be booted by the function package, and the license expiry date of the license file has not been exceeded (that is, expired). The application boot judging part 208 may otherwise not permit the booting of the function package.

In FIGS. 8A and 8B, it is assumed for the sake of convenience that the installing of the sales package and the importing of the license are carried out in parallel. In addition, it is assumed for the sake of convenience that the sales package is acquired by the package management server 60. However, only the installing of the sales package may be carried out, without simultaneously importing the license. In addition, the sales package may not always be acquired by the package management server 60. For example, the install target may be a sales package that is downloaded to the equipment managing apparatus 10 through a certain route (for example, a download from a Web site) and stored in the auxiliary storage device 102. Hence, a description will now be given of procedures of a process of installing such a sales package, by referring to FIG. 21.

Figure 21:
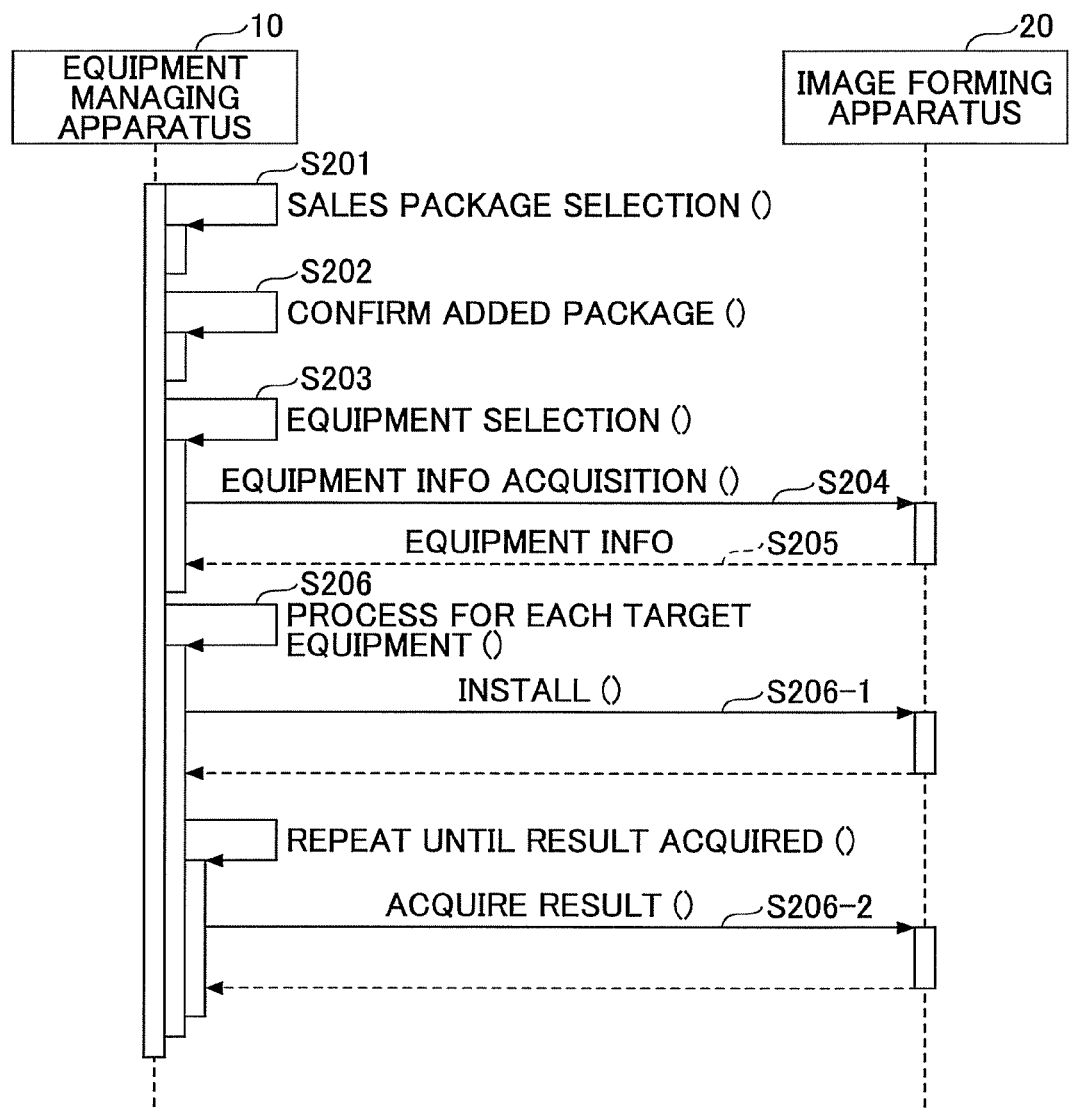
FIG. 21 is a sequence diagram for explaining procedures of a process of installing the sales package stored in the equipment managing apparatus.

FIG. 21 is a sequence diagram for explaining procedures of a process of installing the sales package stored in the equipment managing apparatus.

In a step S201, the UI control part 111 may accept the sales package that is the install target and is specified by the operator. For example, the sales package may be specified by displaying on the display device 106 a screen including a list of sales packages recorded in the auxiliary storage device 102 by the UI control part 111, and urging the operator to specify the sales package from the list on the screen. Then, in a step S202, the UI control part 111 may display on the display device 106 a confirmation screen including the information recorded within the sales package information file of the sales package (hereinafter referred to as a "current sales package") that is specified as the install target, for example, in order to urge the operator to confirm the contents of the current sales package.

When a continue instruction instructing continuation of the install process is input by the operator, by pushing a confirmation button (or an OK button) on the confirmation screen, for example, the install destination accepting part 113 may accept the selection of the image forming apparatus 20 as the install destination of the current sales package, in a step S203. This selection of the image forming apparatus 20 may be made in a manner similar to the selection made in the step S101 illustrated in FIG. 8A.

Next, in steps S204 and 205, the equipment information acquiring part 112 may acquire the equipment information from each image forming apparatus 20 that is selected. The equipment information may be acquired in a manner similar to the acquisition made in steps S102 and S103 illustrated in FIG. 8A. Then, the install control part 114 may send an install request for the current sales package for each image forming apparatus 20 that is selected, in a step S206-1, and make an inquiry on the process result of the install process, in a step S206-2. The step S206-1 may be carried out in a manner similar to the step S122-4 illustrated in FIG. 8B. The step S206-2 may be carried out in a manner similar to the step S122-5 illustrated in FIG. 8B.

In a case where the sales package that is installed by the process illustrated in FIG. 21 requires a license in order for the sales package to be used, a license import process may be carried out separately. In this case, procedures of the license import process may be similar to those illustrated in FIGS. 8A and 8B but excluding the steps related to installing the sales package.

Next, a description will be given of a process of updating the license. In the case of a limited-time license, if the merchandise related to this limited-time license is to be further used continuously, the user may carry out the process of updating the license in order to extend the term of validity of the license of the merchandise.

Figure 22:
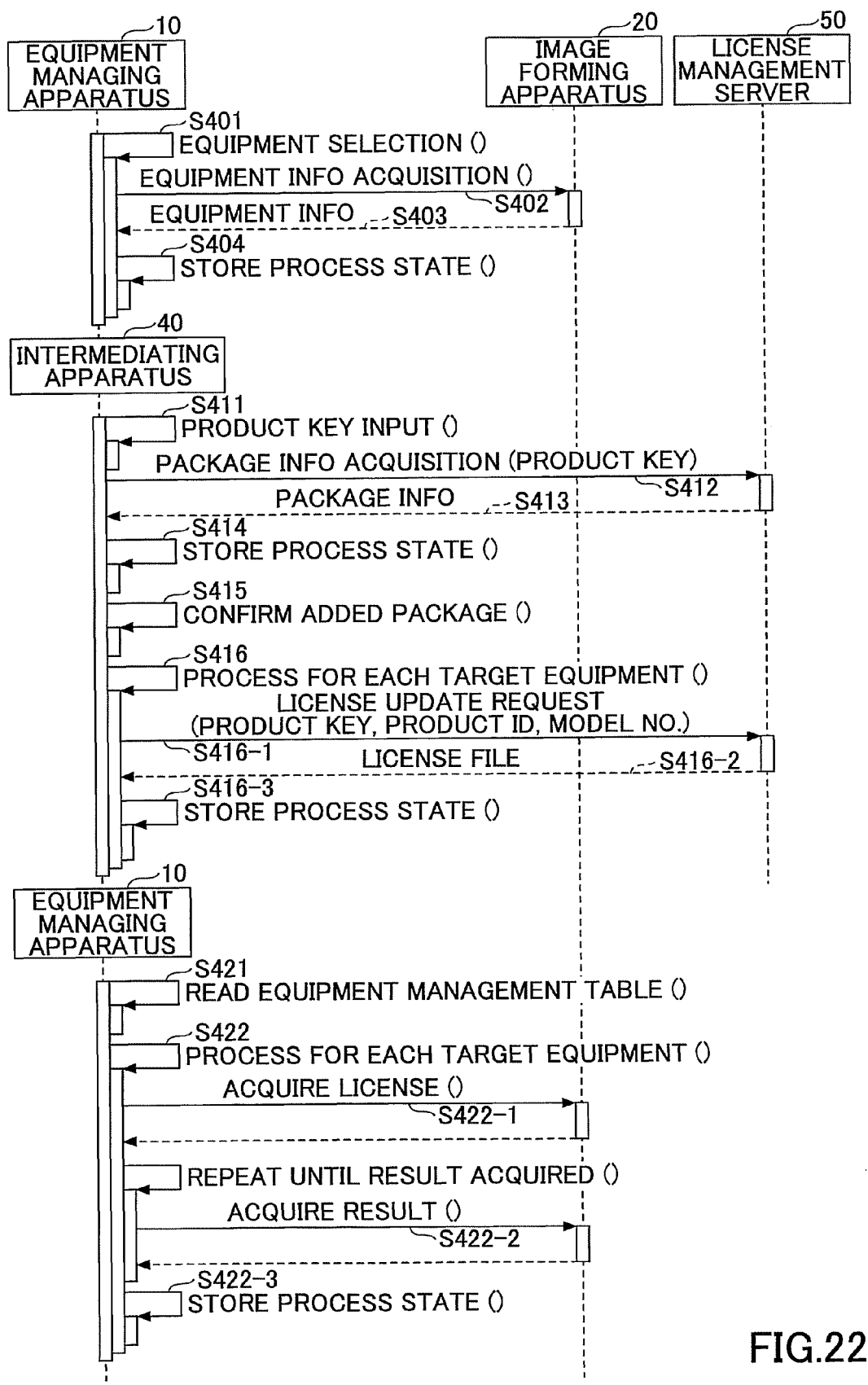
FIG. 22 is a sequence diagram for explaining procedures of a process of updating the license.

FIG. 22 is a sequence diagram for explaining procedures of the process of updating the license (hereinafter also referred to as a "license update process"). The license update process uses an external storage medium 90 other than the external storage medium 90 used in the process illustrated in FIGS. 8A and 8B or, the external storage medium 90 used in the process illustrated in FIGS. 8A and 8B after the data recorded therein have been erased (hereinafter referred to as a "new external storage medium"). In other words, nothing is recorded in the external storage medium 90 when the process illustrated in FIG. 22 is started.

Steps S401 through S404 illustrated in FIG. 22 carry out processes similar to the steps S101 through S104 illustrated in FIG. 8A, using the equipment managing apparatus 10. As a result, the equipment management table is recorded in the external storage medium 90, and the stored contents of the external storage medium 90 may become as illustrated in FIG. 10. But in this example, the image forming apparatus 20 at an updating destination of the license (or license file) is selected in the step S401.

Next, the workplace moves to the manufacturer environment E2, and the external storage medium 90 is set in the intermediating apparatus 40.

In a step S411, the UI control part 41 of the intermediating apparatus 40 may accept input of a product key of a sales package that is a license update target (hereinafter referred to as a "current sales package"), via a product key input screen that is displayed on the display device by the UI control part 41. Then, in steps S412 and S413, the package information acquiring part 42 may specify the input product key, and acquire the package information related to the product key from the license management server 50. The process of acquiring the package information may be similar to that of the steps S112 and S113 illustrated in FIG. 8A.

When the package information acquiring part 42 acquires the package information, the write part 49 may write and record the present process state into the external storage medium 90 in a step S414. More particularly, the write part 49 may record the product key and the package information into the external storage medium 90. As a result, the stored contents of the external storage medium 90 may become as illustrated in FIG. 14. Next, in a step S415, the UI control part 41 may display on the display device a confirmation screen including the received package information, and urge the operator to confirm the contents of the license that is the update target.

When a continue instruction instructing continuation of the license update process is input by the operator, by pushing a confirmation button (or an OK button) on the confirmation screen, for example, the license update process may be carried out for each image forming apparatus 20 that is recorded in the equipment information of the equipment management table within the external storage medium 90, in a step s416.

In other words, in a step S416-1, the license updating part 45 may specify the product key input in the step S411, the product ID of the current sales package, and the model number of the image processing apparatus 20 that is the processing target (that is, the current equipment), and send a license update request (or a request to generate a new license file) to the license management server 50. The license managing part 52 of the license management server 50 may carry out a license update process in response to receiving the license update request. More particularly, in a case where the license format of the record corresponding to the product key, the product ID, and the model number in the license update request is the limited-time license in the license management table 53, the license managing part 52 updates the term of validity of the license and the license issue date for the record. In addition, in a case where the status of the record is "check-in", the license managing part 52 updates the status of the record to "check-out". In this case, the new term of validity of the license may be obtained by adding the term of validity of the license to the latter one of the license expiry date that has been registered up to that point in time and present point in time (or on that day). Further, the new license issue date may be the year, month and date of that day. The license update process may be carried out for a plurality of records if a plurality of product IDs are specified.

Next, in a step S416-2, the license managing part 52 generates a license file including the product ID, the model number, and the term of validity of license recorded for the record, for each record that is updated in the license management table 53 (that is, for each sales package that is the license update target), and returns the license file to the license updating part 45.

Then, in a step S416-3, the write part 49 may write and record the present process state into the external storage medium 90. More particularly, the write part 49 may record in the external storage medium 90 a license archive file storing the license file that is returned. In addition, if the license update process is successful, the write part 49 may update the value of the work status for the record corresponding to the current equipment in the equipment management table to a value indicating that the license update process is completed ("license update complete").

The operation in the manufacturer environment E2 may be completed by the processes described heretofore. Next, the operator moves to the user environment E1. In addition, the external storage medium 90 recorded with the newly issued license file and the like is set in the equipment managing apparatus 10.

In a step S421, the read part 119 of the equipment managing apparatus 10 acquires the equipment management table from the external storage medium 90 in response to the setting of the external storage medium 90 therein. Then, steps S422-1 through S422-3 are carried out in a manner similar to the steps S122-7 through 122-9 illustrated in FIG. 8B, for each image forming apparatus 20 having the value indicating "license update complete" for the work status. As a result, in the image forming apparatus 20, the old license file is replaced by the license of the updated license, and the duration for which the sales package related to the license file may be used is extended.

The accounting with respect to the updating of the license may be made by periodically monitoring the license management table 53 from the license managing part 52, for example. In other words, if a record having a license issue date after the previous accounting exists in the license management table 53, the license managing part 52 may determine that the accounting is to be made with respect to the license related to this record.

Next, a description will be given of a process of uninstalling a sales package that has become unnecessary and releasing the license thereof.

Figure 23:
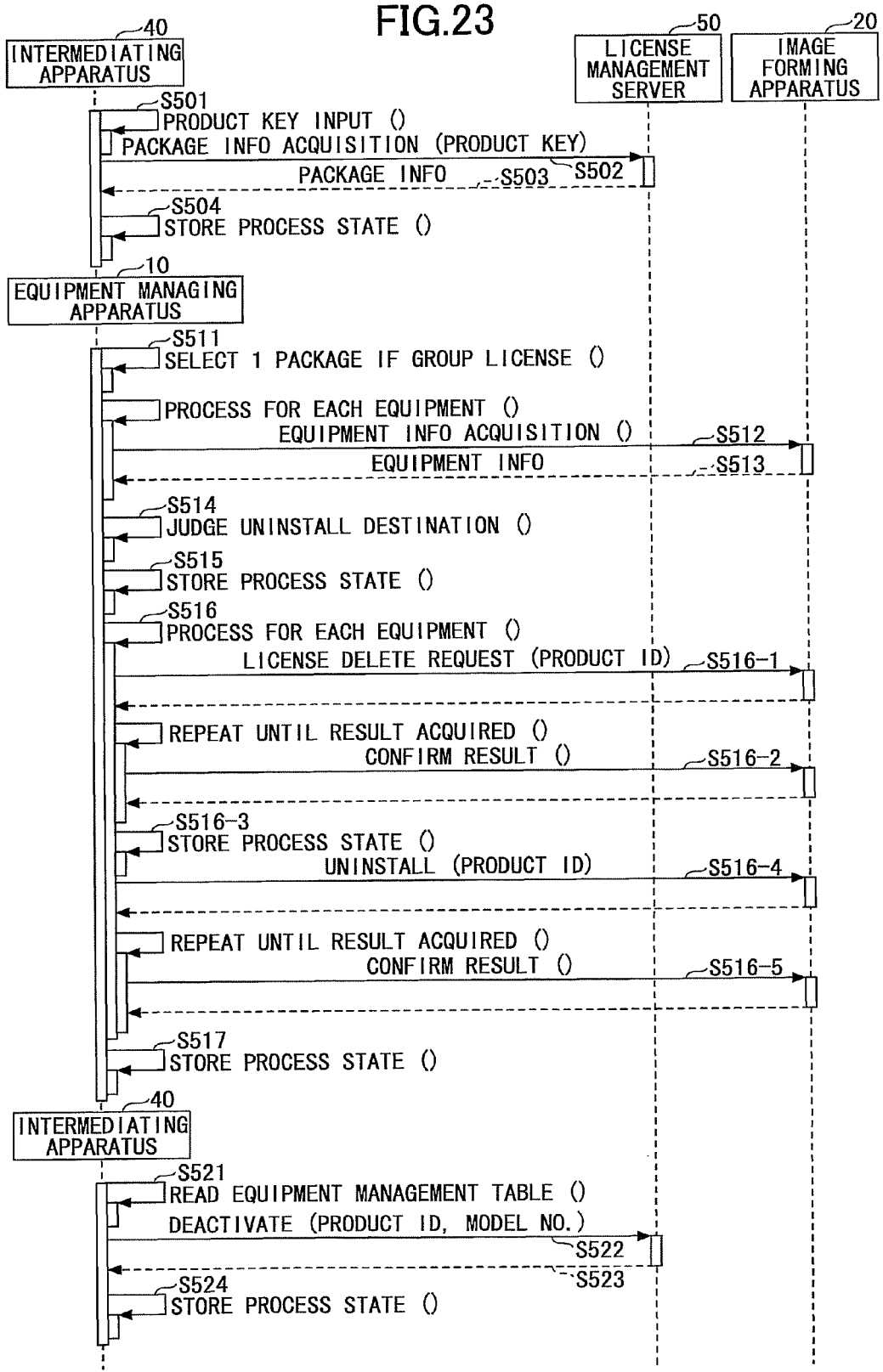
FIG. 23 is a sequence diagram for explaining procedures of a process of uninstalling the sales package and releasing the license.

FIG. 23 is a sequence diagram for explaining procedures of the process of uninstalling the sales package and releasing the license. In FIG. 23, the work is first performed in the manufacturer environment E2. Hence, a new external storage medium 90 is set in the intermediating apparatus 40.

In a step S501 illustrated in FIG. 23, the UI control part 41 of the intermediating apparatus 40 may accept a product key of an uninstall target input by the operator via an uninstall screen that is displayed on the display device by the UI control part 41. Then, in a step S502, the package information acquiring part 42 may specify the input product key, and send to the license management server 50 an acquisition request for the package information related to the product key.

In a step S503, the license managing part 52 of the license management server 50 may return to the package information acquiring part 42 the package information recorded in the record related to the received product key (that is, the record of the license management table 53). In a case where the product key is related to a group license, the package information that is returned to the package information acquiring part 42 may relate to a plurality of sales packages.

When the package information acquiring part 42 receives the package information, the write part 49 may record the present process state into the external storage medium 90 in a step S504. More particularly, the write part 49 may record the product key and the package information into the external storage medium 90. In the case where the product key is related to the group license, the package information related to a plurality of sales packages may be received and recorded into the external storage medium 90.

After the process described heretofore is completed, the operator moves to the user environment E1. Hence, the external storage medium 90 is set in the equipment managing apparatus 10.

The read part of the equipment managing apparatus 10 may acquire the package information from the external storage medium 90 in response to the setting of the external storage medium 90 in the equipment managing apparatus 10. In a case where a plurality of package information exist, the UI control part 111 may display on the display device 106 a sales package selection screen including the sales package that is the uninstall target, and urge the operator to select the sales package that is the uninstall target, in a step S151. The sales package that is selected as the uninstall target will hereinafter be referred to as a "current sales package".

Next, in a step S512, the equipment information acquiring part 112 may send an acquisition request for the equipment information with respect to each image forming apparatus 20. In a step S513, the equipment information issuing part 202 of each image forming apparatus 20 may acquire the information recorded in the install information management table 209, in response to the acquisition request for the equipment information, and return to the equipment information acquiring part 112 the equipment information including the acquired information and the model number of the corresponding image forming apparatus 20.

Then, in a step S514, the uninstall destination judging part 116 may collate the package information read from the external storage medium 90 with the equipment information acquired from each image forming apparatus 20 in the step S513, and determine the image forming apparatus 20 that is installed with the sales package related to the package information. More particularly, the image forming apparatus 20 related to the equipment information that includes the product ID included in the package information (that is, the product ID of the sales package) is determined as the image forming apparatus 20 that is installed with the sales package, that is, the image forming apparatus 20 at the uninstall destination of the sales package.

Next, in a step S515, the write part 120 may write and record the present process state into the external storage medium 90. More particularly, the write part 120 may record (or generate) in the external storage medium 90 the equipment management table that includes the model number and the equipment information for each image forming apparatus 20 at the uninstall destination of the sales package.

In a step S516, a loop process may be carried out for each image forming apparatus 20 at the uninstall destination of the sales package. The image forming apparatus 20 that is the processing target in the loop process will hereinafter be referred to as a "current equipment".

In a step S516-1, the license deletion control part 118 may specify the product ID of the current sales package, and send to the current equipment a delete request for the license file. The license deleting part 206 of the current equipment may delete the license file related to the specified product ID.

Next, in a step S516-2, the license deletion control part 118 makes an inquiry on the result of the license file delete process to the current equipment. The inquiry (or polling) may be repeated until the license file delete process is completed in the current equipment and the result of the license delete process is returned to the license deletion control part 118.

Then, in a step S516-3, the write part 120 may write and record the present process state into the external storage medium 90. More particularly, when the license file delete process is successful, the write part 120 may update the value of the work status for the record corresponding to the current equipment in the equipment management table to a value indicating that the license file delete process is completed ("license deletion complete"). On the other hand, if the license file delete process fails, the value of the work status for the record corresponding to the current equipment in the equipment management table may not be updated, and the subsequent processes may not carried out with respect to the current equipment. Hence, the step S516-1 and the subsequent steps may be carried out with respect to the next image forming apparatus 20.

In a step S516-4, the uninstall control part 117 may specify the product ID of the current sales package, and send the uninstall request (or delete request for the sales package) to the current equipment. The uninstall part 205 of the current equipment may uninstall (or delete) the sales package related to the specified product ID, in response to the uninstall request.

In a step S516-5, the uninstall control part 117 may make an inquiry on the uninstall result of the current sales package to the current equipment. The inquiry (or polling) may be repeated until the uninstall process is completed in the current equipment and the uninstall result is returned to the uninstall control part 117.

In a step S517, the write part 120 may write and record the present process state into the external storage medium 90. More particularly, when the uninstalling of the current sales package is successful, the write part 120 may update the value of the work status for the record corresponding to the current equipment in the equipment management table to a value indicating that the uninstalling of the current sales package is completed ("uninstall complete"). On the other hand, if the uninstalling of the current sales package fails, the value of the work status for the record corresponding to the current equipment in the equipment management table may not be updated, and the subsequent processes may not be carried out with respect to the current equipment. Hence, the step S516-1 and the subsequent steps may be carried out with respect to the next image forming apparatus 20.

When the process described heretofore is completed, the operator again moves to the manufacturer environment E2. Hence, the external storage medium 90 is set in the intermediating apparatus 40.

In a step S521, the read part 48 of the intermediating apparatus 40 may acquire the equipment management table and the package information from the external storage medium 90, in response to the setting of the external storage medium 90 in the intermediating apparatus 40. In a step S522, the license deletion control part 118 may specify the product ID of the current sales package included in the acquired package information, and the model number of all image forming apparatuses 20 having the value indicating "uninstall complete" or "license deletion complete" for the work status in the equipment management table, and send a license release request to the license managing part 52 of the license management server 50.

The license managing part 52 may change (or modify) the status of the record related to the specified product ID and model number from "check-out" to "check-in" in the license management table 53. In other words, information indicating that the license is not used may be recorded in the license management table 53. The license having the status "check-out" may be released. Hence, if the status of the target record is not "check-out", the license managing part 52 may determine that the releasing of the license failed.

Next, in a step S523, the license managing part 52 returns the result of the process of releasing the license (that is, whether the releasing is successful) to the license deletion control part 118 of the image forming apparatus 20.

Then, in a step S524, the write part 49 may write and record the present process state into the external storage medium 90. More particularly, when the releasing of the license is successful, the write part 49 may update the value of the work status for the record corresponding to the current equipment in the equipment management table to a value indicating that the releasing of the license is completed ("license release complete"). On the other hand, if the releasing of the license fails, the value of the work status for the record corresponding to the current equipment in the equipment management table may not be updated.

By carrying out the process illustrated in FIG. 23, the function package included in the sales package becomes no longer usable in the image forming apparatus 20 at the uninstall destination. On the other hand, because the license of this sales package is released, this license may be used in another image forming apparatus 20 if necessary provided that it is within the term of validity of the license. In other words, the license release process may be useful particularly in a case where the license of the sales package in a first image forming apparatus 20 is to be moved to a second image forming apparatus 20 due to an expiry of the lease contract for the first image forming apparatus, for example.

According to this embodiment, operations such as the installing of the sales package, the import of the license, the updating of the license, the uninstalling of the sales package, and the release of the license may be performed even in a state where no network communication is possible between the equipment managing apparatus 10 and each of the license management server 50 and the package management server 60, by utilizing the intermediating apparatus 40 and the external storage medium 90 as information exchange media between the equipment managing apparatus 10 and each of the license management server 50 and the package management server 60.

In addition, according to the equipment managing system 1 of this embodiment, the installing of the sales package related to the product key and the import of the license file with respect to the image forming apparatus 20 may be performed simultaneously, in response to the input of the product key. For this reason, the operation load on the operator may be reduced considerably.

Furthermore, according to the equipment managing apparatus 10 of this embodiment, the installing of the sales package and the import of the license file may be performed simultaneously with respect to a plurality of image forming apparatuses 20. For this reason, the operation load on the operator may be reduced considerably, also from this point of view.

Although the embodiment uses the image forming apparatus 20 as an example of the electronic equipment, the application of the embodiment and the present invention is not limited to the image forming apparatus 20. The embodiment and the present invention is similarly applicable to any electronic equipment capable of additionally installing a program.

An external storage device that is connectable to the network may be used in place of the external storage medium 90 that is portable. For example, in the user environment E1, the external storage device may be connectable to the intermediating apparatus 40 via the Internet or the like. The equipment managing apparatus 10 may connect to the external storage device via a LAN, for example. In this case, the external storage device may be used in common between the intermediating apparatus 40 and the equipment managing apparatus 10. Each of the intermediating apparatus 40 and the equipment managing apparatus 10 may monitor the external storage device, and automatically start its own process if the other writes information to the external storage device.

Of course, the embodiment described above may be applied to an environment in which a network communication is possible between the equipment managing apparatus 10 and each of the license management server 50 and the package management server 60.

Further, the present invention is not limited to these embodiments, but various variations and modifications may be made without departing from the scope of the present invention.

What is claimed is:

1. An equipment managing system comprising:
an intermediating apparatus connectable to a license management apparatus and a program management apparatus via a first network; and
an equipment managing apparatus connectable to an electronic equipment via a second network,
the equipment managing apparatus having no network connection to the intermediating apparatus, the license management apparatus and the program management apparatus, so that no direct information exchange is possible between the equipment managing apparatus and each of the intermediating apparatus, the license management apparatus and the program management apparatus,
the license management apparatus storing, in a related manner, a license identifier to identify a license of a program of the electronic equipment, a product identifier of the program, and license state information indicating a state of use of the license of the program related to the license identifier,
the program management apparatus storing the program and the product identifier in a related manner,
the intermediating apparatus comprising:
a license identifier accepting part configured to accept an input of a license identifier related to an install target;
a product information acquiring part configured to acquire from the license management apparatus the product identifier related to the input license identifier;
a program acquiring part configured to acquire from the program management apparatus the program related to the product identifier acquired by the product information acquiring part;
a license acquiring part configured to specify the license identifier and acquire from the license management apparatus a license file corresponding to the license identifier, and to update the license state information related to the license identifier to a value indicating that the license is in use; and
a first write part configured to record the program acquired by the program acquiring part and the license file acquired by the license acquiring part in an external storage medium, and
the equipment management apparatus comprising:
a first read part configured to acquire the license file and the program from the external storage medium;
an install control part configured to send the program acquired by the first read part to the electronic equipment; and
a license import part configured to send the license file acquired by the first read part to the electronic equipment.

2. The equipment managing system as claimed in claim 1, wherein:
the equipment management apparatus comprises:
an equipment information acquiring part configured to acquire, from the electronic equipment, equipment information including an equipment identifier of the electronic equipment and the product identifier of the program installed in the electronic equipment; and
a second write part configured to record the equipment information acquired by the equipment information acquiring part in the external storage medium, and
the intermediating apparatus comprises:
an adequacy confirming part configured to send the equipment information and the product identifier acquired by the product information acquiring part to the program management apparatus, and to control the program management apparatus to determine whether a program at a depending destination of the program related to the product identifier is installed in the electronic equipment based on dependency information that is stored in a dependency information storage part and indicates a dependency relationship between the programs.

3. The equipment managing system as claimed in claim 2, wherein:
the program acquiring part acquires from the program management apparatus a program at the depending destination if the program at the depending destination is not installed in the electronic equipment; and
the first write part records the program at the depending destination in the external storage medium.

4. The equipment managing system as claimed in claim 1, wherein:
the license managing apparatus stores an expiry date of the license and in a related manner to the license identifier;
the license identifier accepting part accepts an input of the license identifier related to a license update target;
the intermediating apparatus comprises:
a license updating part configured to control the license management apparatus to update the expiry date of the license related to the license identifier by specifying the license identifier related to the license update target, and to receive a second license file including the updated expiry date;
the first write part records the second license file in the external storage medium;
the first read part acquires the second license file from the external storage medium; and
the equipment management apparatus comprises:
a license update control part configured to send the second license file acquired by the first read part to the electronic equipment.

5. The equipment managing system as claimed in claim 1, wherein:
the license identifier accepting part accepts an input of the license identifier related to an uninstall target;
the first write part records the product identifier acquired by the product information acquiring part in the external storage medium based on the license identifier related to the uninstall target;
the first read part acquires the product identifier from the external storage medium;
the equipment managing apparatus comprises:
an uninstall control part configured to control the electronic equipment to uninstall the program related to the product identifier acquired by the first read part;
a license deletion control part configured to control the electronic equipment to delete the license file related to the product identifier acquired by the first read part; and
a second write part configured to write the equipment information, and work status information indicating that the program is uninstalled and the license file is deleted, in the external storage medium.

6. The equipment managing system as claimed in claim 5, wherein the intermediating apparatus comprises:
a second read part configured to acquire the product identifier and the work status information from the external storage medium; and
a license release part configured to control the license management apparatus to update the license state information related to the product identifier to a value indicating that the license is not used, depending on the work status information acquired by the second read part.

7. An equipment managing method to be implemented by an equipment managing system, comprising:
including, in the equipment managing system, an intermediating apparatus connectable to a license management apparatus and a program management apparatus via a first network, and an equipment managing apparatus connectable to an electronic equipment via a second network,
the equipment managing apparatus having no network connection to the intermediating apparatus, the license management apparatus and the program management apparatus, so that no direct information exchange is possible between the equipment managing apparatus and each of the intermediating apparatus, the license management apparatus and the program management apparatus,
the license management apparatus storing, in a related manner, a license identifier to identify a license of a program of the electronic equipment, a product identifier of the program, and license state information indicating a state of use of the license of the program related to the license identifier,
the program management apparatus storing the program and the product identifier in a related manner,
the intermediating apparatus executes a process comprising:
a license identifier accepting procedure to accept an input of a license identifier related to an install target;
a product information acquiring procedure to acquire from the license management apparatus the product identifier related to the input license identifier;
a program acquiring procedure to acquire from the program management apparatus the program related to the product identifier acquired by the product information acquiring procedure;
a license acquiring procedure to specify the license identifier and acquire from the license management apparatus a license file corresponding to the license identifier, and to update the license state information related to the license identifier to a value indicating that the license is in use; and
a first write procedure to record the program acquired by the program acquiring procedure and the license file acquired by the license acquiring procedure in an external storage medium, and
the equipment management apparatus executes a process comprising:
a first read procedure to acquire the license file and the program from the external storage medium;

an install control procedure to send the program acquired by the first read procedure to the electronic equipment; and a license import procedure to send the license file acquired by the first read procedure to the electronic equipment.

8. The equipment managing method as claimed in claim 7, wherein:

the process executed by the equipment management apparatus further comprises:

an equipment information acquiring procedure to acquire, from the electronic equipment, equipment information including an equipment identifier of the electronic equipment and the product identifier of the program installed in the electronic equipment; and a second write procedure to record the equipment information acquired by the equipment information acquiring procedure in the external storage medium, and the process executed by the intermediating apparatus further comprises:

an adequacy confirming procedure to send the equipment information and the product identifier acquired by the product information acquiring procedure to the program management apparatus, and to control the program management apparatus to determine whether a program at a depending destination of the program related to the product identifier is installed in the electronic equipment based on dependency information that is stored in a dependency information storage part and indicates a dependency relationship between the programs.

9. The equipment managing method as claimed in claim 8, wherein:

the program acquiring procedure acquires from the program management apparatus a program at the depending destination if the program at the depending destination is not installed in the electronic equipment; and the first write procedure records the program at the depending destination in the external storage medium.

10. The equipment managing method as claimed in claim 7, wherein:

the license managing apparatus stores an expiry date of the license and in a related manner to the license identifier;

the license identifier accepting procedure accepts an input of the license identifier related to a license update target;

the process executed by the intermediating apparatus further comprises:

a license updating procedure to control the license management apparatus to update the expiry date of the license related to the license identifier by specifying the license identifier related to the license update target, and to receive a second license file including the updated expiry date;

the first write procedure records the second license file in the external storage medium;

the first read procedure acquires the second license file from the external storage medium; and the process executed by the equipment management apparatus further comprises:

a license update control procedure to send the second license file acquired by the first read part to the electronic equipment.

11. The equipment managing method as claimed in claim 7, wherein:

the license identifier accepting procedure accepts an input of the license identifier related to an uninstall target;

the first write procedure records the product identifier acquired by the product information acquiring procedure in the external storage medium based on the license identifier related to the uninstall target;

the first read procedure acquires the product identifier from the external storage medium;

the process executed by the equipment managing apparatus further comprises:

an uninstall control procedure to control the electronic equipment to uninstall the program related to the product identifier acquired by the first read procedure;

a license deletion control procedure to control the electronic equipment to delete the license file related to the product identifier acquired by the first read procedure; and a second write procedure configured to write the equipment information, and work status information indicating that the program is uninstalled and the license file is deleted, in the external storage medium.

12. The equipment managing method as claimed in claim 11, wherein the process executed by the intermediating apparatus further comprises:

a second read procedure to acquire the product identifier and the work status information from the external storage medium; and a license release procedure to control the license management apparatus to update the license state information related to the product identifier to a value indicating that the license is not used, depending on the work status information acquired by the second read procedure.

13. A non-transitory computer-readable storage medium which stores a program which, when executed by a computer, causes the computer to execute an equipment managing method in an equipment managing system, comprising:

including, in the equipment managing system, an intermediating apparatus connectable to a license management apparatus and a program management apparatus via a first network, and an equipment managing apparatus connectable to an electronic equipment via a second network, the equipment managing apparatus having no network connection to the intermediating apparatus, the license management apparatus and the program management apparatus, so that no direct information exchange is possible between the equipment managing apparatus and each of the intermediating apparatus, the license management apparatus and the program management apparatus, the license management apparatus storing, in a related manner, a license identifier to identify a license of a program of the electronic equipment, a product identifier of the program, and license state information indicating a state of use of the license of the program related to the license identifier, the program management apparatus storing the program and the product identifier in a related manner, the program causing the computer to function as the intermediating apparatus by executing a process comprising:

a license identifier accepting procedure to accept an input of a license identifier related to an install target;

a product information acquiring procedure to acquire from the license management apparatus the product identifier related to the input license identifier;

a program acquiring procedure to acquire from the program management apparatus the program related to the product identifier acquired by the product information acquiring procedure;

a license acquiring procedure to specify the license identifier and acquire from the license management apparatus a license file corresponding to the license identifier, and to update the license state information related to the license identifier to a value indicating that the license is in use; and a first write procedure to record the program acquired by the program acquiring procedure and the license file acquired by the license acquiring procedure in an external storage medium, the program causing the computer to function as the equipment management apparatus to execute a process comprising:

a first read procedure to acquire the license file and the program from the external storage medium;

an install control procedure to send the program acquired by the first read procedure to the electronic equipment; and a license import procedure to send the license file acquired by the first read procedure to the electronic equipment.

14. The non-transitory computer-readable storage medium as claimed in claim 13, wherein:

the process executed by computer to function as the equipment management apparatus further comprises:

an equipment information acquiring procedure to acquire, from the electronic equipment, equipment information including an equipment identifier of the electronic equipment and the product identifier of the program installed in the electronic equipment; and a second write procedure to record the equipment information acquired by the equipment information acquiring procedure in the external storage medium, and the process executed by the computer to function as the intermediating apparatus further comprises:

an adequacy confirming procedure to send the equipment information and the product identifier acquired by the product information acquiring procedure to the program management apparatus, and to control the program management apparatus to determine whether a program at a depending destination of the program related to the product identifier is installed in the electronic equipment based on dependency information that is stored in a dependency information storage part and indicates a dependency relationship between the programs.

15. The non-transitory computer-readable storage medium as claimed in claim 14, wherein:

the program acquiring procedure acquires from the program management apparatus a program at the depending destination if the program at the depending destination is not installed in the electronic equipment; and the first write procedure records the program at the depending destination in the external storage medium.

16. The non-transitory computer-readable storage medium as claimed in claim 13, wherein:

the license managing apparatus stores an expiry date of the license and in a related manner to the license identifier;

the license identifier accepting procedure accepts an input of the license identifier related to a license update target;

the process executed by the computer to function as the intermediating apparatus further comprises:

a license updating procedure to control the license management apparatus to update the expiry date of the license related to the license identifier by specifying the license identifier related to the license update target, and to receive a second license file including the updated expiry date;

the first write procedure records the second license file in the external storage medium;

the first read procedure acquires the second license file from the external storage medium; and the process executed by the computer to function as the equipment management apparatus further comprises:

a license update control procedure to send the second license file acquired by the first read part to the electronic equipment.

17. The non-transitory computer-readable storage medium as claimed in claim 13, wherein:

the license identifier accepting procedure accepts an input of the license identifier related to an uninstall target;

the first write procedure records the product identifier acquired by the product information acquiring procedure in the external storage medium based on the license identifier related to the uninstall target;

the first read procedure acquires the product identifier from the external storage medium;

the process executed by the computer to function as the equipment managing apparatus further comprises:

an uninstall control procedure to control the electronic equipment to uninstall the program related to the product identifier acquired by the first read procedure;

a license deletion control procedure to control the electronic equipment to delete the license file related to the product identifier acquired by the first read procedure; and a second write procedure configured to write the equipment information, and work status information indicating that the program is uninstalled and the license file is deleted, in the external storage medium.

18. The non-transitory computer-readable storage medium as claimed in claim 17, wherein the process executed by the intermediating apparatus further comprises:

a second read procedure to acquire the product identifier and the work status information from the external storage medium; and a license release procedure to control the license management apparatus to update the license state information related to the product identifier to a value indicating that the license is not used, depending on the work status information acquired by the second read procedure.

19. The equipment managing system as claimed in claim 1, wherein the external storage medium is portable.

* * * * *